US012621565B2

(12) United States Patent
Nakamura

(10) Patent No.: US 12,621,565 B2
(45) Date of Patent: May 5, 2026

(54) IMAGE CAPTURING APPARATUS, AND CONTROL METHOD AND STORAGE MEDIUM FOR IMAGE CAPTURING APPARATUS

(71) Applicant: CANON KABUSHIKI KAISHA, Tokyo (JP)

(72) Inventor: Shun Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/428,824

(22) Filed: Jan. 31, 2024

(65) Prior Publication Data

US 2024/0267618 A1 Aug. 8, 2024

(30) Foreign Application Priority Data

Feb. 2, 2023 (JP) ................................. 2023-014378

(51) Int. Cl.
*H04N 23/67* (2023.01)
*H04N 23/611* (2023.01)
*H04N 23/695* (2023.01)

(52) U.S. Cl.
CPC ........... *H04N 23/67* (2023.01); *H04N 23/611* (2023.01); *H04N 23/695* (2023.01)

(58) Field of Classification Search
CPC .... H04N 23/67; H04N 23/611; H04N 23/695; H04N 23/61; H04N 23/635; H04N 23/673; H04N 23/675
See application file for complete search history.

(56) References Cited

U.S. PATENT DOCUMENTS

| | | | |
|---|---|---|---|
| 2008/0002028 A1* | 1/2008 | Miyata ................. | H04N 23/635 348/169 |
| 2019/0011805 A1* | 1/2019 | Ota ........................ | H04N 23/53 |
| 2021/0360146 A1* | 11/2021 | Kimishima ............ | H04N 23/73 |
| 2022/0272273 A1* | 8/2022 | Miyazaki ............. | H04N 23/683 |
| 2024/0314430 A1* | 9/2024 | Kurata ..................... | G02B 7/28 |
| 2025/0216747 A1* | 7/2025 | Shimizu ................. | G03B 13/36 |

FOREIGN PATENT DOCUMENTS

JP 2009271557 A 11/2009

* cited by examiner

*Primary Examiner* — Lin Ye
*Assistant Examiner* — Tuan H Le
(74) *Attorney, Agent, or Firm* — Canon U.S.A., Inc. IP Division

(57) ABSTRACT

An apparatus including a detecting unit configured to detect a subject from a captured image; a tracking unit configured to track the detected subject; a focus adjustment unit configured to control focus adjustment based on the captured image; and a determining unit configured to, in a case where the tracking unit is tracking a specific subject, determine if a tracking region in which the specific subject is being tracked is at an end portion of a captured image in a case in which focus adjustment is being performed in the tracking region and a focus adjustment mode in which focus adjustment is not performed when a subject is not being tracked has been set.

23 Claims, 32 Drawing Sheets

IMAGE CAPTURING APPARATUS, AND CONTROL METHOD AND STORAGE MEDIUM FOR IMAGE CAPTURING APPARATUS

BACKGROUND

Technical Field

The aspect of the embodiments relates to a focus adjustment technology for an image capturing apparatus.

Description of Related Art

When a subject is brought into focus using autofocus (referred to below as "AF") in an image capturing apparatus, there are cases in which a focus control occurs that was not intended by the photographer. For example, in a case in which AF is being performed for a specific subject that was detected by the image capturing apparatus, when the subject that is detected leaves the frame to outside of the image capturing screen, there is a need to maintain the focus state from when they left the frame, and to not perform AF on a different subject such as, for example, the background. In relation to this need, there is a technology that performs a limited AF, such that AF is performed when a subject has been detected, and AF is not performed when a subject is not detected. However, even in cases in which the subject that has been detected has left the frame, the range finding position for the AF has not left the frame and is still stopped within the image capturing screen, and therefore, there are cases in which an incorrect AF is performed on the background or the like that is included in the AF range finding range, and the focus state from when the subject left the frame cannot be maintained. Japanese Patent Application Laid-Open No. 2009-271557 discloses a technique for controlling shifts in focus by controlling the AF speed such that it becomes slow until it can be determined that the subject does not exist within the screen when a state in which the subject can be detected has changed to a state in which the subject cannot be detected.

However, in the technology that has been disclosed in Japanese Patent Application Laid-Open No. 2009-271557, regardless of whether or not a subject exists inside of the screen and the subject can be detected, in cases in which a different subject is included in the AF range finding range, there is a possibility that a shift in the focus cannot be controlled.

SUMMARY

An apparatus comprises at least one process and a memory coupled to the at least one processor storing instructions that, when executed by the at least one processor, cause the at least one processor to function as: a detection unit configured to detect a subject from a captured image; a tracking unit configured to track the detected subject; a focus adjustment unit configured to control focus adjustment based on the captured image; and a determining unit configured to determine whether or not a tracking region in which a predetermined subject is being tracked is at an end portion of a captured image when a focal adjustment mode is set, wherein the focal adjustment mode is a mode in which focus adjustment is performed in the tracking region when the predetermined subject is being tracked by the tracking unit, and focal adjustment is not performed when the predetermined subject is not being tracked, wherein, in a case in which the determining unit has determined that the tracking region is at an end portion of an image, the tracking unit releases a tracking state.

Further features of the disclosure will become apparent from the following description of exemplary embodiments with reference to the attached drawings.

DESCRIPTION OF THE EMBODIMENTS

First Embodiment

Figure 1:
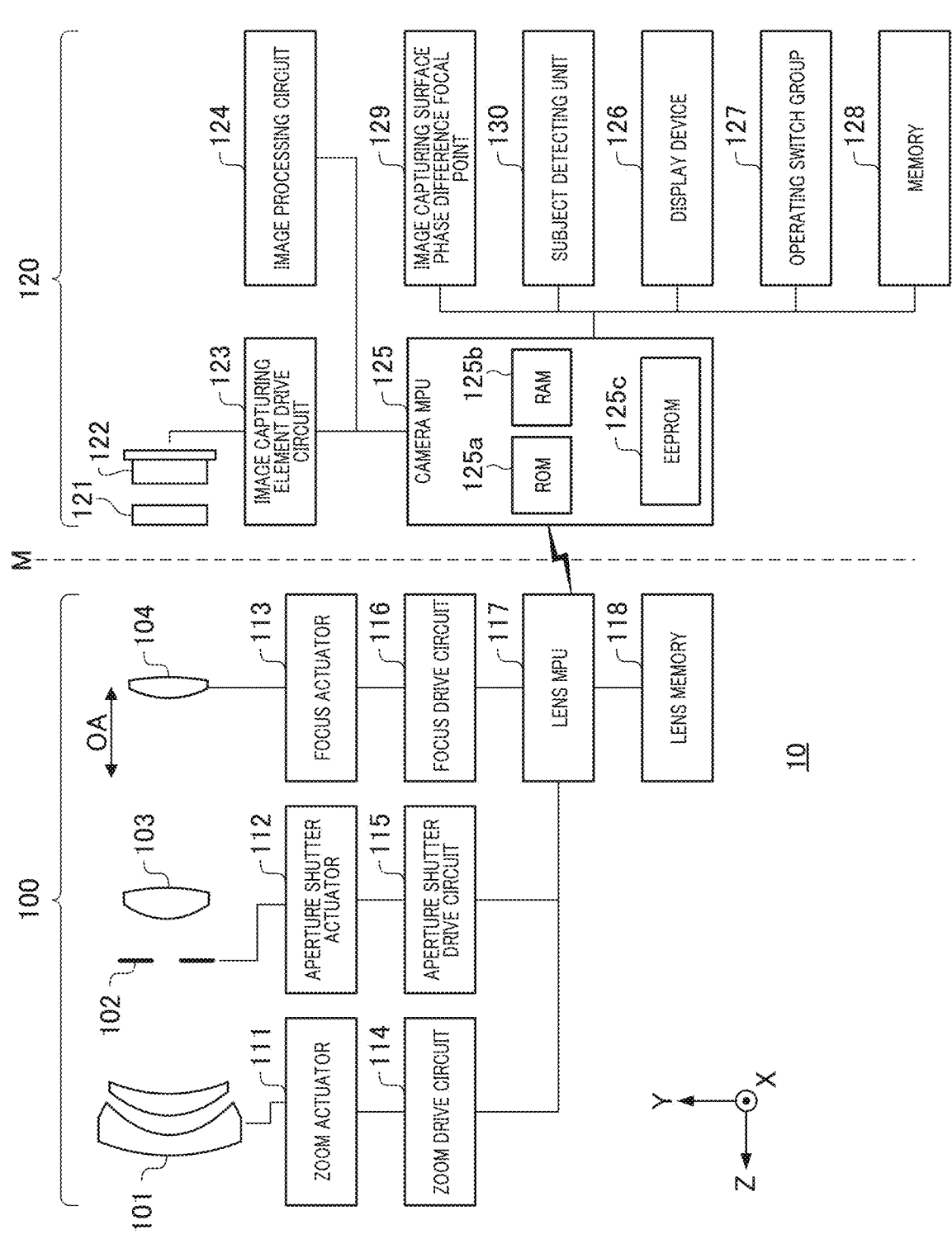
FIG. 1 is a diagram showing a configuration of an image capturing apparatus.

FIG. 1 is a diagram showing a configuration of an image capturing apparatus according to the present embodiment. An image capturing apparatus 10 is an image capturing apparatus having an AF function, and has a camera body 120, and a lens unit 100, which is an image capturing optical system that is detachable from the camera body 120. The lens unit 100 is mounted on the camera body 120 via a mount M that is shown by a dotted line in FIG. 1. Note that in the present embodiment, although an explanation is given of a digital camera with changeable lenses as one example of the image capturing apparatus 10, the disclosure not limited thereto, and this may also be an image capturing apparatus in which the body of the image capturing apparatus and the lens apparatus are one.

The lens unit 100 forms an optical image of a subject on an image capturing element 122. The lens unit 100 has an optical system including a plurality of lenses, and a drive/control system. The lens unit 100 drives/controls the optical system based on a signal from a camera MPU, and adjusts the magnification, focus position, amount of light and the like for the subject that reaches the image capturing element 122. In FIG. 1, the Z axis is the same axis as the optical axis OA, and the X axis and the Y axis are orthogonal to each other on a plain that is perpendicular to the Z axis.

The optical system of the lens unit 100 has a first lens group 101, an aperture 102, a second lens group 103, and a focus lens group (referred to below simply as a "focus lens") 104. The first lens group 101 is positioned on the tip of the lens unit 100, and is movably supported in the direction of the optical axis. The aperture 102 has a function for adjusting the amount of light at the time of image capturing. The aperture 102 and the second lens group 103 are one, and are movable in the direction of the optical axis, and a zoom function is executed by these being moved in cooperation with the first lens group 101. The focus lens 104 is also movable in the direction of the optical axis, and the subject distance (focal distance) at which the optical image is brought into focus changes according to the position of the focus lens 104. Focus adjustment that adjusts the focal distance of the lens unit 100 is performed by controlling the position of the focus lens 104 in the direction of the optical axis.

The drive/control system of the lens unit 100 has a zoom actuator 111, an aperture actuator 112, and a focus actuator 113 that drive the parts of the optical system. In addition, the drive/control system of the lens unit 100 also has a zoom drive circuit 114, an aperture drive circuit 115, a focus drive circuit 116, a lens microprocessor (referred to below as a "lens MPU") 117, and a lens memory 118. The zoom drive circuit 114 uses the zoom actuator 111 to drive the first lens group 101, the aperture 102, and the second lens group 103 in the direction of the optical axis OA, and to control the angle of view of the optical system of the lens unit 100. The aperture drive circuit 115 uses the aperture actuator 112 to drive the aperture 102, and to control the diameter of the opening and the opening and closing operations of the aperture 102. The focus drive circuit 116 uses the focus actuator 113 to drive the focus lens 104 in the direction of the optical axis OA and to change the focal distance for the optical system of the lens unit 100. In addition, the focus drive circuit 116 detects the current position of the focus lens 104 using the focus actuator 113.

The lens MPU 117 performs calculations and control relating to the lens unit 100, and controls the zoom drive circuit 114, the aperture drive circuit 115, and the focus drive circuit 116. In addition, the lens MPU 117 is connected to a camera microprocessor (referred to below as a "camera MPU") 125 via the mount M, and communicates signals and data. For example, the lens MPU 117 detects the position of the focus lens 104, and notifies the camera MPU 125 of the focus lens position information according to requests from the camera MPU 125. The focus lens position information includes information such as the position of the focus lens 104 in the direction of the optical axis OA, the position in the direction of the optical axis OA and the diameter of the emission pupil when in a state in which the optical system is not moving, and the position in the direction of the optical axis OA and the diameter of a lens frame that limits the optical flux of the emission pupil, or the like. In addition, the lens MPU 117 controls the zoom drive circuit 114, the aperture drive circuit 115, and the focus drive circuit 116 according to requests from the camera MPU 125. In one embodiment, the lens memory 118 is a memory on which optical information necessary for automatic focus detection, and programs related to lens control are stored in advance. The camera MPU 125 controls the operations of the lens unit 100 by executing a program that is stored on, for example, a built-in nonvolatile memory, or the lens memory 118.

The camera body 120 has an optical system (an optical low pass filter 121 and the image capturing element 122), and a drive/control system. The first lens group 101, the aperture 102, the second lens group 103, and the focus lens 104 of the lens unit 100 and the optical low pass filter of the camera body 120 configure an image capturing optical system. The optical lowpass filter 121 is a filter for reducing false colors and moiré in captured images.

The image capturing element 122 is configured by an image sensor, which is a photoelectronic conversion element, and a peripheral circuit, as well horizontal direction m pixels and vertical direction n pixels (m, n is an integer equal to or greater than 2) are arranged therein. The image sensor is, for example, a CMOS image sensor. The image capturing element 122 outputs a captured image (an image signal, an analogue signal) based on an optical image. In addition, the image capturing element 122 of the present embodiment has a pupil dividing function, and phase difference AF using image data is possible.

The drive/control system has an image capturing element drive circuit 123, an image processing circuit 124, the camera MPU 125, a display device 126, an operating switch group 127, a memory 128, an image capturing surface phase difference focus detecting unit (referred to below as a "focus detecting unit") 129, and a subject detecting unit 130. The image capturing element drive circuit 123 controls the operations of the image capturing element 122, and also A/D converts an image signal that has been acquired from the image capturing element 122 and transmits this to the image processing circuit 124 or the camera MPU 125.

The image processing circuit 124 generates data for use in phase difference AF, display image data, and recording image data from the image data that is output by the image capturing element drive circuit 123. In addition, it also performs the general image processing that is performed in digital cameras on the image data, such as, for example γ conversion, white balance adjustment processing, color interpolation processing, compression encoding processing, and the like. The image processing circuit 124 outputs the data for use in phase difference AF, display image data, recording image data, and post image processing data that have been generated to the camera MPU 125.

The camera MPU 125 performs calculations and control relating to the camera body 120, and controls the image capturing element drive circuit 123, the image processing circuit 124, the display device 126, the operating switch group 127, the memory 128, the focus detecting unit 129, and the subject detecting unit 130. In addition, the camera MPU 125 is connected to the lens MPU 117 via a signal line for the mount M, and performs communication of signals and data with the lens MPU 117. The camera MPU 125 sends focus lens position acquisition requests, aperture, focus lens, and zoom drive requests for predetermined drive amounts, and acquisition requests for optical information that is unique to the lens unit 100 to the lens MPU 117. In addition, in the present embodiment, the camera MPU 125 also functions as a tracking unit configured to track a subject that has been detected by the subject detecting unit 130. In addition, the camera MPU 125 also functions as a focus adjusting unit configured to perform focus adjustment by controlling the drive of the focus lens 104 based on a defocus amount that has been calculated by the image surface phase difference focus detecting unit 129 based on a captured image that has been acquired by the image capturing element 122. In addition, the camera MPU 125 also functions as a determining unit configured to perform determinations in order to perform control of the subject tracking state and control of the focus adjustment operations based on conditions such as the position of the subject being tracked, or the like.

The camera MPU 125 has a ROM 125*a*, a RAM 125*b*, and an EEP ROM 125*c* in addition to a processor. The ROM (Read Only Memory) 125*a* stores a program that controls camera operations. The RAM (random access memory) 125*b* stores variables. In addition, the RAM 125*b* is also used a temporary working storage area for the camera MPU 125. The EEPROM (Electrically Erasable Programmable Read-Only Memory) 125*c* stores various parameters, each type of setting information for the camera body 120 that has been set by the user, and the like. Note that the image surface phase difference focus detecting unit 129 and the subject detecting unit 130 may also be realized by the camera MPU 125.

The display device 126 displays information relating to the image capturing mode of the camera, preview images from before image capturing, images for confirmation from after image capturing, focus state display images for the type of focus detection, each type of setting value, and the like. The display device 126 has, for example, a liquid crystal display (LCD) on the back surface of the camera body 120. In addition, the display device 126 is provided with a touch panel having touch operating functions, and it is possible to operate the camera by operations such as directly touching the display device 126, or the like. By associating input coordinates and display coordinates on the touch panel, it is possible to configure a GUI such that it is possible for the user to directly operate a screen that has been displayed on the touch panel. Note that in the present embodiment, an example is explained in which images and settings values are displayed on an LCD that has been mounted on the back surface of the camera body 120. However, the disclosure is not limited thereto. For example, if the image capturing apparatus has been provided with an EVF (electronic view finder), the images may also be displayed on the EVF. In addition, in a case in which the image capturing apparatus is remotely operated using another device such as a smartphone or the like to which the image capturing apparatus 10 has been connected, it may also be made such that an image capturing preparation screen for use in synthesis is displayed on a screen of a device for the photographer to confirm the image capturing.

The operating switch group 127 has a power source switch, a focus adjustment start switch, a release (image capturing trigger) switch, a zoom operation switch, an image capturing mode selection switch, a video image capturing switch, and the like, and receives operations from the user. Note that a portion of the operating switch group 127 may also be realized by the touch panel of the display device 126. The memory 128 is a storage medium that stores captured images. The memory 128 is, for example, a flash memory that can be detached from the camera body 120.

The focus detecting unit 129 detects a focus for a subject based on a captured image (image data, an image signal) that has been captured by the image capturing element 122, and processed by the image capturing element drive circuit 12 and the image processing circuit 124. In the present embodiment, the focus detecting unit 129 performs focus detection processing with a phase difference detecting method using data for use in focus detection that is obtained by the image processing circuit 124. Specifically, the image processing circuit 124 generates image data for each pair that is formed by luminous fluxes passing through different pupil regions to serve as the data for use in the focus detection. In addition, the focus detecting unit 129 detects a focus deviation amount based on a deviation amount for the image data for each of these pairs. In this manner, the focus detecting unit 129 of the present embodiment performs phase difference AF (image capturing surface phase difference AF) based on an output from the image capturing element 122, without using a dedicated AF sensor. The operations of the focus detecting unit 129 will be explained below in detail.

The subject detecting unit 130 detects a subject from a captured image (image data, captured image signal) that is obtained by the image processing circuit 124. As the subject, the subject detecting unit 130 detects, for example, a person's face, or a pupil included therein, the body of an animal, or a face/pupil included therein, the entire body of a vehicle, or a characteristic portion included therein (the operator of the vehicle, the cockpit, or the like). In addition, the subject detecting unit 130 may also be made to detect a subject that exists in a position that a user has indicated within a captured image via a touch operation from the user to an image that has been displayed on the display device 126. In addition, during the subject detection, it is also possible to detect what position of the image data a goal subject exists in. The results of the subject detection are output to the camera MPU 125 and are used in subject tracking and focus adjustment.

Figure 2A:
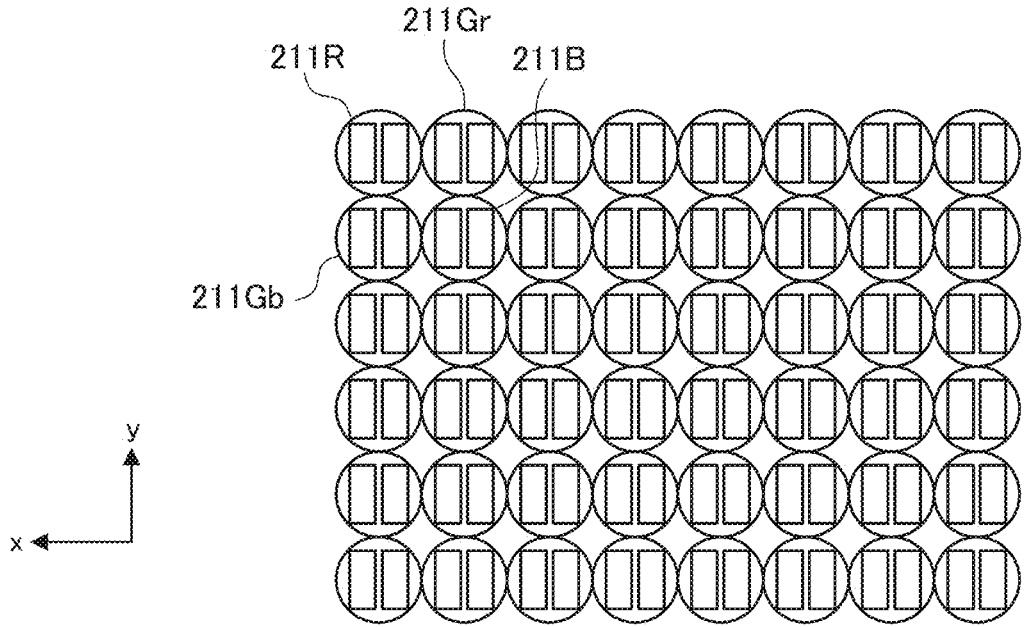
FIGS. 2A and B are diagrams explaining an image capturing element.
Figure 2B:
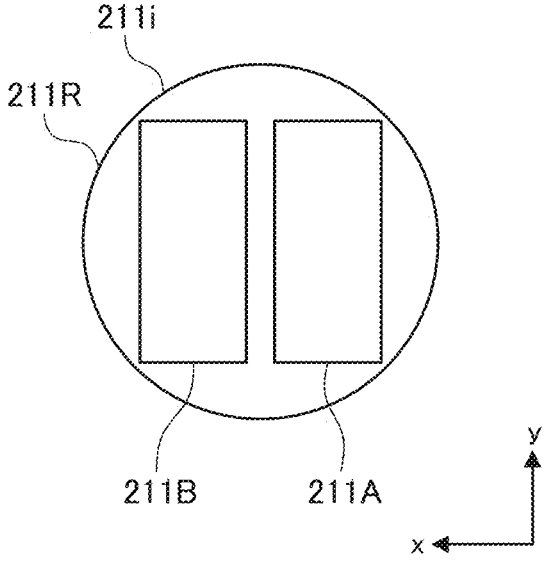

The operations of the focus detecting unit 129 will be explained in detail using FIGS. 2A and 2B. FIGS. 2A and 2B are diagrams explaining the image capturing element. FIG. 2A is a diagram explaining one example of an image capturing pixel array for the image capturing element 122. FIG. 2A shows a state in which a range of six vertical rows (the y direction) and eight horizontal rows (the x direction) of a 2-dimensional C-MOS sensor of the image capturing element 122 have been observed from the lens unit 100 side. Pixels are arranged 2-dimensionally and systematically in the image capturing element 122. As a specific example, the color filter for a Bayer array is provided on the image capturing element 122, wherein alternating red (R) and green (Gr) color filters are arranged in order from the left on the pixels in the odd-numbered rows, and alternating green (Gr) and blue (B) color filters are arranged in order from the left on the pixels in the even numbered rows.

FIG. 2B is a diagram explaining the configuration of a pixel. FIG. 2B shows the configuration of a pixel 211R. The pixel 211R has one micro-lens 211i. One pixel has a plurality of photoelectric conversion units per one micro-lens. In the present embodiment, an example is explained for a case in which there are 2 photoelectric conversion units (a first photoelectric conversion unit 211A and a second photoelectric conversion unit 211B) disposed inside of a micro-lens. The pixel 211Gr, the pixel 211Gb, and the pixel 211B also have the same configuration as the pixel 211R. That is, the image capturing element 122 of the present embodiment has pixels in which the photoelectric conversion units of the pixels have been divided in two in the X direction. The photoelectric conversion signals in each of the photoelectric conversion units can be used as data for use in the phase difference AF, or used in the generation of parallax images that configure a 3D (three-dimensional) image. In addition, the sum of the photoelectric conversion signals can be used as regular captured image data.

In this context, the pixel signals for a case in which phase difference AF is performed are explained. In the present embodiment, luminous fluxes that are emitted from the image capturing optical system are pupil divided by the micro-lens 211i of FIG. 2B and the divided pair of the photoelectric conversion unit 211A and the photoelectric conversion unit 211B. A pair of photoelectric conversion units receives luminous fluxes that pass through different pupil regions of the image capturing optical system via one micro-lens 211i. Image data (an A image and a B image) that become a pair of point of view images are generated from the luminous fluxes that have been received by each photoelectric conversion unit. It is possible to acquire a pair of image data based on luminous fluxes that pass through difference pupil regions of the image capturing optical system by making each pixel of the image capturing element 122 have a pair of photoelectric conversion units.

In the present embodiment, focus detection is performed based on an image deviation amount (phase difference) in the X direction. Phase difference AF by focus detection based on an image deviation amount in the X direction will be explained. In FIG. 2B, the signals for the photoelectric conversion units 211A that are disposed in the plurality of pixels 211R that are disposed inside of a pre-determined range in the same pixel row are used as the A image for use in the focus detection, and the signals for the photoelectric conversion units 211B are used as the B image for use in the focus detection. The output of the photoelectric conversion units 211A and the photoelectric conversion units 211B use a simulated luminance (Y) signal that has been calculated by adding together the outputs for the green, red, blue, and green that are included in the unit array for the color filter. However, an A image and a B image for use in the focus detection may also be formed for each of the colors of red, blue, and green. By performing detection by correlating the phase image deviation amounts for a pair of signals, which are the A image and B image for use in the focus detection that have been generated in this manner, it is possible to detect a prediction, which is the degree of correlation for the pair of image signals. The camera MPU 125 is able to detect the defocus amount for a predetermined region by multiplying the prediction by a conversion coefficient. The sum of the outputs for a photoelectric conversion unit 211A and a photoelectric conversion unit 211B form one pixel (output pixel) for the output image.

Figure 3:
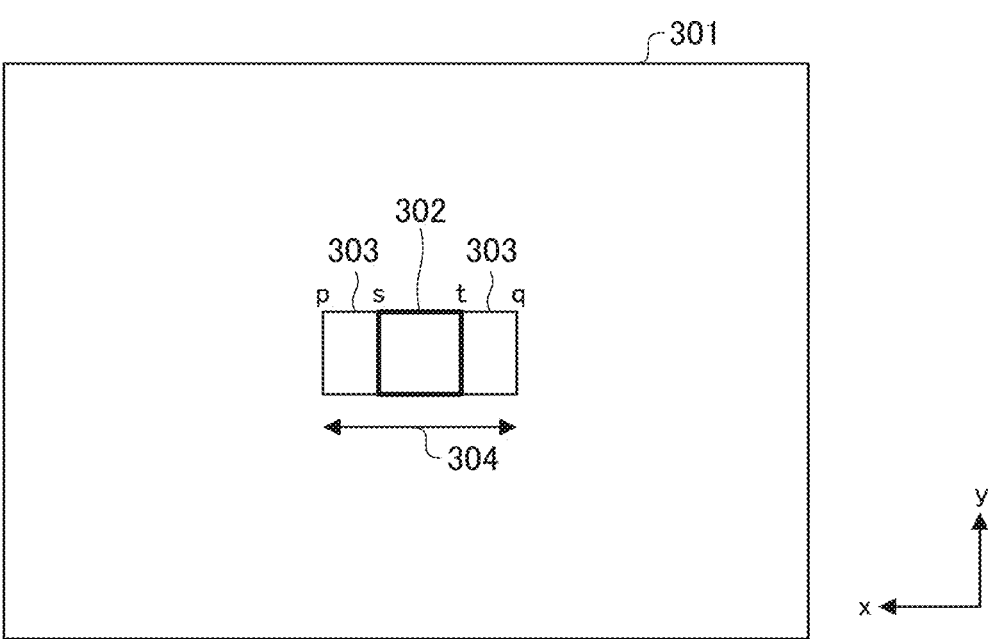
FIG. 3 is a diagram showing an AF region that is used in focus detection processing.

Focus detection using the A image and B image for use in focus detection will be explained using FIG. 3 to FIG. 6B. FIG. 3 is a diagram showing the AF region that is used in the focus detection processing. The AF region 302 shows an AF region in a pixel array 301 of the image capturing element 122 that is used in the focus detection processing. In one embodiment, shift regions 303 on both sides of the AF region 302 are regions that are necessary for the correlation. Therefore, a region 304 that combines the AF region 302 and the shift regions 303 is the pixel region necessary for correlation. Within the diagrams, p, q, s, and t each show coordinates in the X direction, wherein each of p and q show the X coordinates for the starting point and the end point of the pixel region 304, and s and t show the x coordinates for the starting point and the end point for the AF region 302.

Figure 4A:
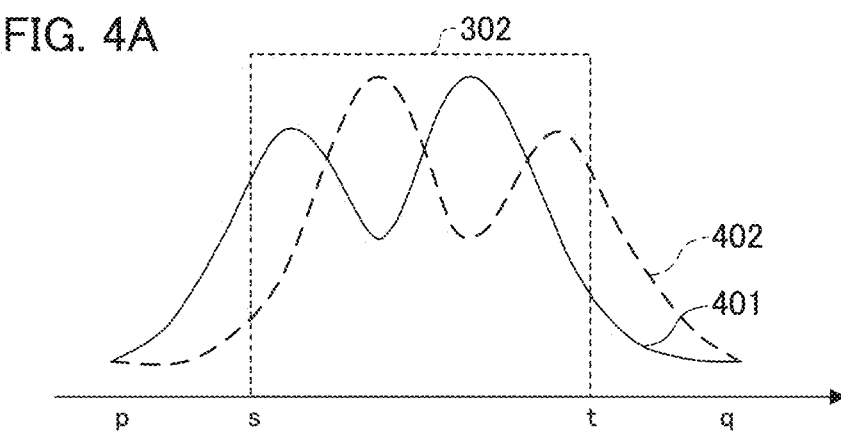
FIGS. 4A to 4C are diagrams showing a pair of image signals that are obtained from an AF region.
Figure 4B:
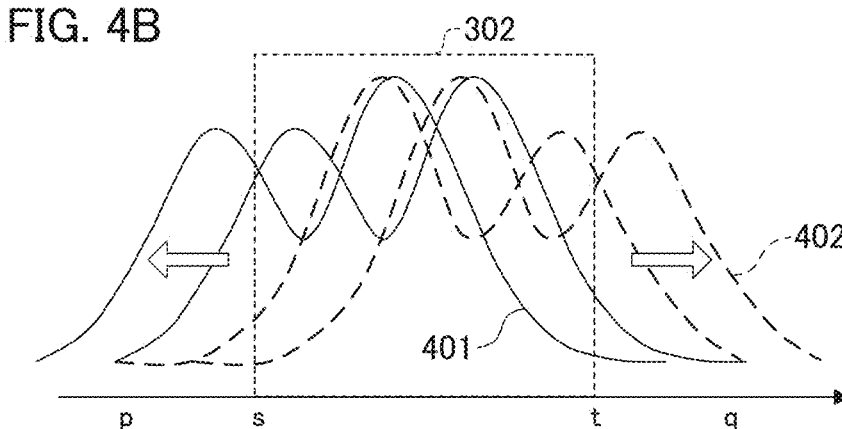
Figure 4C:
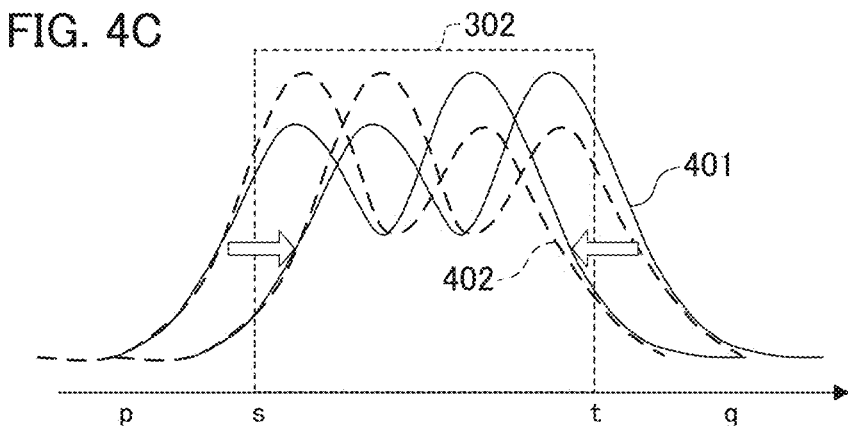

FIG. 4A to FIG. 4C are diagrams showing a pair of image signals that are obtained from an AF region. The solid line in FIG. 4A to FIG. 4C is the A image that is acquired from a plurality of pixels included in the AF region. The dotted line is the B image that has been acquired from a plurality of pixels that are included in the AF region. FIG. 4A shows the A image and the B image before shifting. FIG. 4B shows a state in which the A image and the B image have been shifted in the plus direction from the state in FIG. 4A. FIG. 4C shows a state in which the A image and the B image have been shifted in the minus direction from the state in FIG. 4A. When the correlation amount is calculated for the pair of the A image 401 and the B image 402, both the A image 401 and the B image 402 are shifted by one bit at a time in the direction of the arrows that are shown in FIG. 4B and FIG. 4C.

Next, the calculation method for the correlation amount will be explained. First, as is shown in FIG. 4B and FIG. 4C, the A image 401 and the B image 402 are both shifted by one bit at a time, and the sum of the absolute values for the differences between the A image 401 and the B image 402 is calculated. When the shift amount is made i, the greatest shift amount in the minus direction is made p-s, the greatest shift amount in the plus direction is made q-t, x is made the starting coordinate for the AF region 302, and y is made the ending coordinate for the AF region 302, the correlation amount COR can be calculated using the Formula (1) below.

$$COR[i] = |[k+i] - B[k-i]| \tag{1}$$

$$\{(p-s) < i < (q-t)\}$$

Figure 5A:
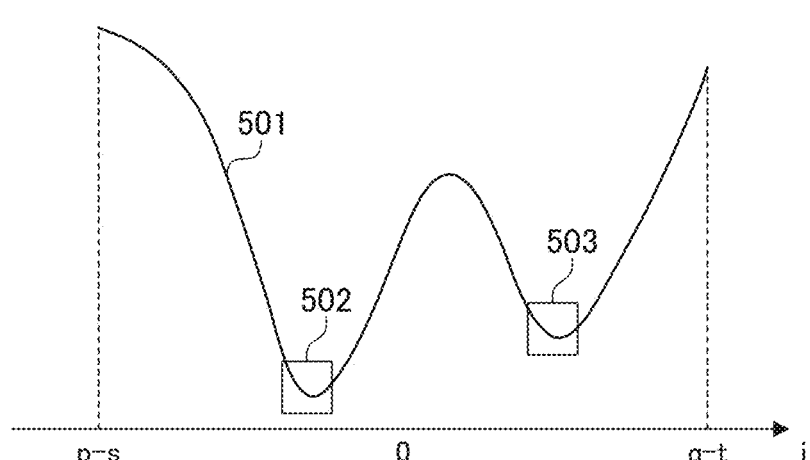
FIGS. 5A and 5B are diagrams explaining the relationship between a shift amount and a correlation amount for a pair of image signals.
Figure 5B:
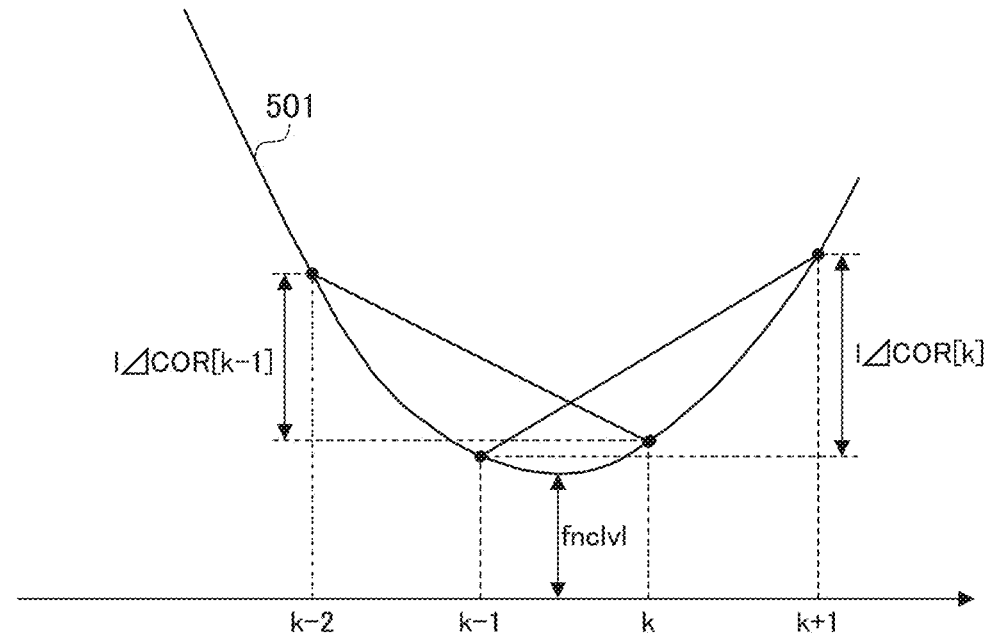

FIG. 5A and FIG. 5B are diagrams explaining the relationship between the shift amount and the correlation amount for the pair of image signals. FIG. 5A shows the relationship between the shift amount and the correlation amount COR. FIG. 5B is an enlarged view of the portion of FIG. 5A that shows the area 502 surrounding the extremum of FIG. 5A. In FIG. 5A and FIG. 5B, the horizontal axis shows the shift amount, and the vertical axis shows the correlation amount COR. The correlation amount 501 shows the correlation amount for the A image and the B image in wave form, and the area 502 around the extremum and the area 503 around the extremum show the vicinity of the extremum of the correlation amount 501. It can be said that the smaller that the correlation amount is, the higher the degree of agreement between the A image and the B image will be. That is, the highest that the degree of agreement for the A image and the B image, which are the pair of image signals for use in focus detection, becomes is in a shift amount that corresponds to a smaller correlation amount from among the plurality of areas around the extremum in the correlation amount 501. In the example that is shown in FIG. 5A, from among the area 502 around the extremum and the area 503 around the extremum in the correlation amount 501 that changes along with the shift amount, the degree of agreement between the pair of the A image and the B image becomes the largest in the shift amount for the area 502 around the extremum, which is the shift amount corresponding to a smaller correlation amount.

Next, the calculation method for the correlation change amount will be explained. The difference in correlation amounts with intervals of one shift in the waveform for the correlation amount 501 that has been shown in FIG. 5A is calculated as the correlation change amount. When the shift amount is made i, the largest shift amount in the minus direction is made p-s, and the largest shift amount in the plus direction is made q-t, the correlation change amount ΔCOR can be calculated using the Formula (2) below.

$$\triangle COR[i] = COR[i-1] - COR[i+1] \tag{2}$$

$$\{(p-s+1) < i < (q-t-1)\}$$

Figure 6A:
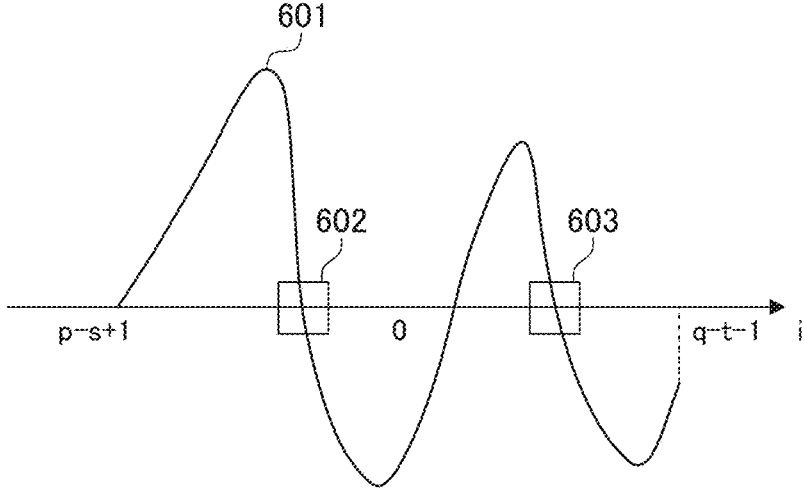
FIGS. 6A and 6B are diagrams explaining the relationship between a shift amount and a correlation amount for a pair of image signals.
Figure 6B:
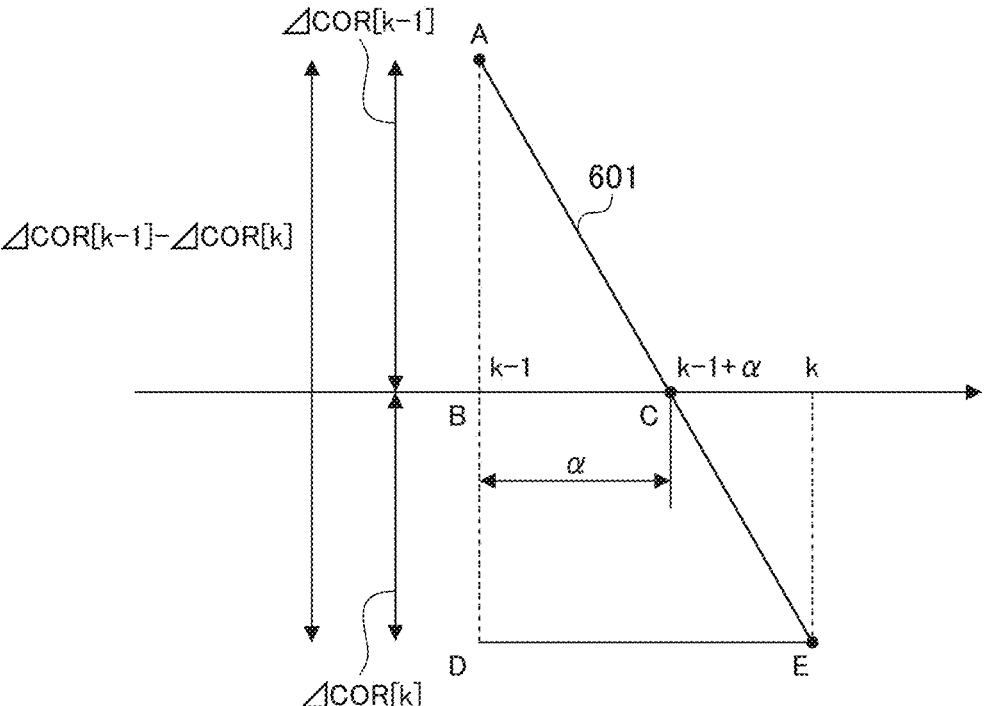

FIGS. 6A and 6B are diagrams explaining the relationship between the shift amount and the correlation change amount for a pair of image signals. FIG. 6A shows the relationship between the shift amount and the correlation change amount ΔCOR. FIG. 6B is an enlarged view of the portion in FIG. 6A in which the vicinity region 602 is shown. In FIG. 6A and FIG. 6B, the horizontal axis shows the shift amount, and the vertical axis shows the correlation change amount ΔCOR. The correlation change amount 601 shows the correlation change amount ΔCOR for the A image and the B image in wave form, and the vicinity region 602 and the vicinity region 603 show the vicinity regions in which the correlation change amounts goes from plus to minus. The correlation change amount 601, which changes along with the shift amount, goes from plus to minus in the vicinity region 602 and the vicinity region 603. A state in which the correlation change amount becomes 0 is called a zero cross, and the degree of agreement for the A image and the B image becomes its highest when this occurs. Therefore, the shift amount that causes a zero cross becomes the image deviation amount.

The calculation method for the image deviation amount will be explained using FIG. 6B. FIG. 6B is an enlarged view of the portion showing the vicinity region 602. The shift amount that causes a zero cross (k−1+α) is divided into an integer part $$\beta(= k-1)$$

and a fraction part α. The fraction part α can be solved using the Formula (3) below from the relationship for the similarity between the triangle ABC and the triangle ADE in the diagram.

$$AB: AD = BC: DE \tag{3}$$

$$\triangle COR[k-1]: \triangle COR[k-1] - \triangle COR[k] = \alpha: k-(k-1)$$

$$\alpha = \frac{\triangle COR[k-1]}{\triangle COR[k-1] - \triangle COR[k]}$$

The integer part β can be solved using the Formula (4) below from FIG. 6B.

$$\beta = k-1 \tag{4}$$

In addition, it is possible to detect the image deviation amount, that is, the predication that is the degree of correlation for the pair of image signals, from the sum of α and β.

As is shown in FIG. 6A, in a case in which a plurality of zero crosses exists for the correlation change amount ΔCor, the one with the sharpest change in the correlation change amount ΔCOR from the surrounding area is made the first zero cross. This sharpness is an index showing how easy it will be to perform AF, and a larger value shows that it will be easier to perform precise AF for this point. The sharpness maxder can be calculated using the Formula (5) below.

$$\text{max}der = |\triangle COR[k-1]| + |\triangle COR[k]| \tag{5}$$

In this manner, in the present embodiment, in a case in which a plurality of zero crosses exist for the correlation change amount, the first zero cross is determined by the sharpness thereof, and the shift amount that causes this first zero cross is made the prediction.

Next, the calculation method for the reliability of the image deviation amount will be explained. The reliability for the image deviation amount can be defined by the degree of agreement (referred to below as the two-image degree of agreement) fnclvl for the pair of the A image and the B image, and the sharpness of the correlation change amount that was described above. The two-image degree of agreement fnclvl is an index that shows the degree of accuracy of the image deviation amount, and in the correlation method in the present embodiment, the smaller that this value is, the higher the degree of accuracy will be. FIG. 5B is a diagram showing an enlarged view of the portion in FIG. 5A in which the area 502 around the extremum is shown. The two-image degree of agreement fnclvl can be calculated using the Formula (6) below.

$$(i) \text{ when } \triangle COR[k-1] \times 2 \leqq \text{max}der \tag{6}$$

$$fnclvl = COR[k-1] + \triangle COR[k-1]/4$$

$$(ii) \text{ when } \triangle COR[k-1] \times 2 > \text{max}der$$

$$fnclvl = COR[k] + \triangle COR[k]/4$$

Figure 7:
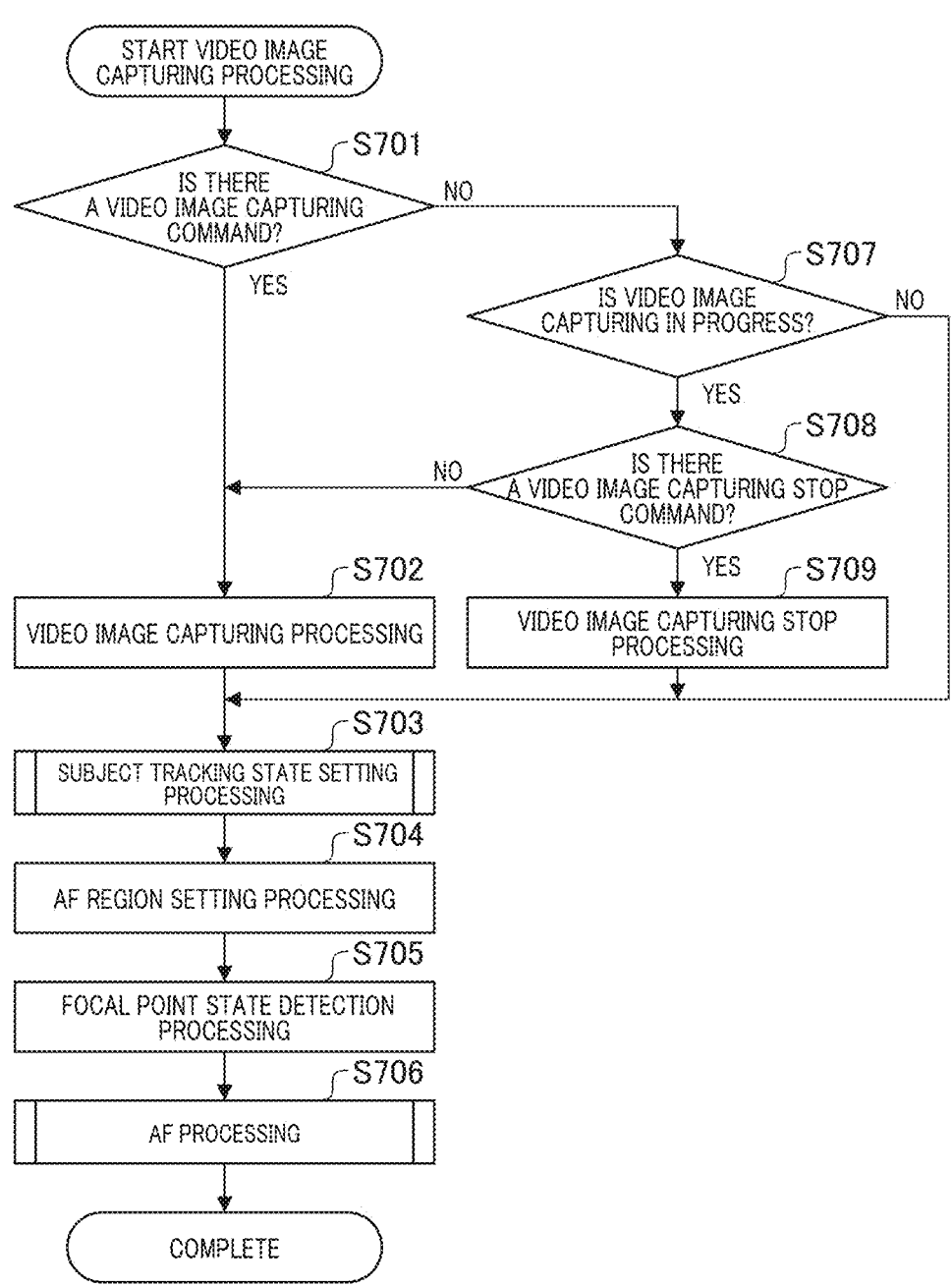
FIG. 7 is a flowchart showing video image capturing processing.

Next, the details of each type of processing that are performed by the image capturing apparatus 10 will be explained using FIGS. 7 to 11. Each type of processing that is shown in FIGS. 7 to 11 is realized by the processor in the camera MPU 125 of the camera body 120 reading out and executing a program for image capturing processing from a memory such as the ROM 125*a* or the like. FIG. 7 is a flowchart showing video image capturing processing. Note that in the present embodiment, a case in which the capturing of a video image is performed is explained as one example, but this may also be the capturing of a still image. The camera MPU 125 executes video image capturing control and AF control by continuously performing video image capturing processing.

In S701, the camera MPU 125 determines whether or not a start command for video image capturing (referred to below as a video image capturing command) has been input. For example, a notification is made for a video image capturing command when the video image capturing switch from the operating switch group 127 has been pressed in a case in which video image capturing is not in progress, or when the video image capturing icon of the display device 126 has been pressed. The camera MPU 125 determines whether or not a start command for video image capturing has been input by detecting a notification for the pressing of the video image capturing switch of the operating switch group 127 or a touch operation to the video image capturing icon of the display device 126. In a case in which there has been a video image capturing command, the camera CPU 125 performs the processing for S702. In contrast, in a case in which there has not been a video image capturing command, the camera MPU 125 executes the processing for S707.

In S702, the camera MPU 125 begins video image capturing processing. During the video image capturing processing, consecutive images that have been captured by the image capturing element 122 are recorded as a video image on the memory 128 via the image capturing element drive circuit 123, the image processing circuit 124, and the camera MPU 125. Upon the video image processing being started, the camera MPU 125 performs the processing for S703. In S703, the MPU camera 125 performs subject tracking state setting processing. In the present embodiment, by controlling the start, continuation, and release of a subject tracking state by the subject tracking state setting processing, in a case in which a mode has been set in which a specific subject is tracked, an unintended subject being brought into focus is suppressed. The details of the subject tracking state processing will described below using FIG. 8. Upon executing the subject tracking state setting processing, the camera MPU 125 performs the processing for S704.

In S704, the camera MPU 125 performs AF region setting processing, During the AF region setting processing, which subject in which position within the image capturing screen to perform AF on is set. The camera MPU 125 changes the setting method for the AF region according to the results of the subject tracking state setting processing for step S703. In a case in which subject tracking is being performed, the MPU 125 sets the AF region based on the position and size for the subject tracking, and when the position or size of the subject that is being tracked changes, the AF region is updated. In contrast, in a case in which no subject is being tracked, the camera MPU 125 sets the AF region according to a user operation, and sets a plurality of AF regions within the screen. In a case in which the camera MPU 125 sets the AF region according to a user operation, a region that has been indicated by, for example, a touch operation by the user to the operating switch group 127 or to the display device 126, is set as a fixed AF region. Upon executing the AF region setting processing, the camera MPU 125 performs the processing for S705.

In S705, the camera MPU 125 makes the focus detecting unit 129 perform focus state detection processing. The focus detecting unit 129 performs processing that acquires the defocus amount for performing image capturing surface phase difference AF, and the information for the reliability of the defocus amount, and notifies the camera MPU 125 of the results. The details of the focus detection processing are as explained using FIG. 3 through FIG. 6B. Upon acquiring the results for the focus state detection processing from the focus detecting unit 129, the camera MPU 125 performs the processing for S706. In S706, the camera MPU 125 executes AF processing, and the video image capturing processing is completed. The details of the AF processing will be explained below using FIG. 10 and FIG. 11.

The processing will be explained for a case in which, during the processing for S701, it has been determined that there is no video image capturing command by the camera MPU 125. In S707, the camera MPU 125 determines whether or not the image capturing apparatus 10 is performing video image capturing. In a case in which video image capturing is being performed, the camera MPU 125 executes the processing for S708. In contrast, in a case in which video image capturing is not being performed, the camera MPU 125 executes the processing for S703.

In S708, it is determined whether or not a stop command for video image capturing (referred to below as a video image capturing stop command) has been input. A notification is given for a video image capturing stop command when, for example, the video image capturing switch from the operating switch group 127 has been pressed during video image capturing, or when the stop video image capturing icon on the display device 126 has been pressed. The camera MPU 125 determines whether or not a stop command for video image capturing has been input by detecting a notification for the pressing down of the video image capturing switch of the operating switch group 127 during video image capturing, or for a touch operation to the video image capturing stop icon of the display device 126. In a case in which the camera MPU 125 has been notified of a video image capturing stop command, it performs the processing for S709. In contrast, in a case in which it has not been notified of a video image capturing stop command, the camera MPU 125 executes the processing for S702, and video image capturing processing is thereby continued. In S709, the camera MPU 125 performs stop processing for the video image capturing. The camera MPU 125 stops the image capturing in the image capturing element and recording of video images to the memory 128. Upon completing the stop processing for the video image capturing, the camera MPU 125 performs the processing for S703.

Next, the subject tracking state setting processing performed by the camera MPU 125 in S703 will be explained using FIG. 8. During the subject tracking state setting processing, one of a subject tracking state or a non-subject-tracking state is set. Whether or not a subject tracking state is set is generally determined based on a command from the user, and the detection state for the subject. Furthermore, in the present embodiment, in a case in which a mode has been set in which AF is performed at the time of subject tracking, even in a state in which subject tracking is possible, whether or not to set the subject tracking state is determined according to whether or not this corresponds to focus shift suppression conditions.

In this context, the details will be explained for two modes that can be set in the focus adjustment mode (AF mode) of the image capturing apparatus 10. In the present embodiment, it is possible to set two AF modes, a "mode that performs AF at the time of subject tracking", and "a mode that performs AF regardless of the subject tracking state". The mode that performs AF at the time of subject tracking is a focus adjustment mode in which, in a case in which a specific subject is being tracked, focus adjustment is performed in the tracking position, and in a case in which tracking is not being performed, focus adjustment is not performed. In the mode in which AF processing is performed at the time of subject tracking, when the specific subject leaves the frame to outside of the image capturing screen, the focus state from when they left the frame is maintained, and it is possible to make this such that AF is not performed on another subject, such as, for example, the background or the like. The mode that performs AF regardless of the subject tracking state is a mode that performs AF on one of the subjects inside of the image capturing screen.

Figure 8:
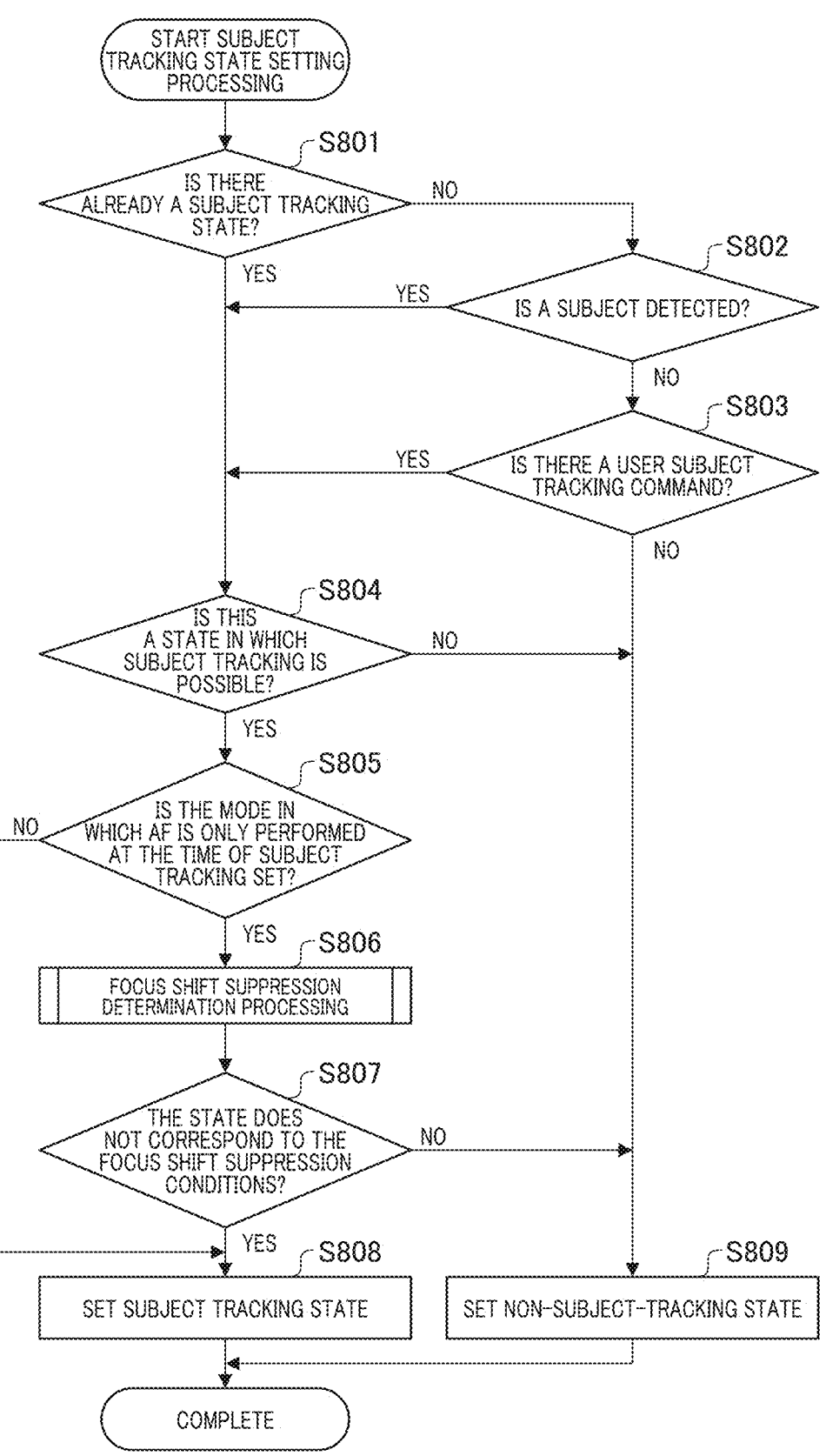
FIG. 8 is a flowchart showing subject tracking state setting processing.

FIG. 8 is a flowchart showing the subject tracking state setting processing. In S801, the camera MPU 125 determines whether or not there is a state in which subject tracking is being performed. The subject that is the target of the tracking may be a subject that has been detected by the subject detecting unit 130, or it may also be a subject that has been detected based on the subject information and color information for a position for which a touch operation was performed by the user on a live-view image that was displayed on the display device 126. In a case in which it has been determined that this is already a subject tracking state, the camera MPU 125 performs the processing for S804. In contrast, in a case in which it has been determined that there is not currently a subject tracking state, the camera MPU 125 performs the processing for S802.

First, the processing that is executed in a case in which this is not a subject tracking state will be explained. In S802, the camera MPU 125 determines whether or not the subject detecting unit 130 detects a subject. In a case in which the subject detecting unit 130 detects a subject, the camera MPU 125 performs the processing for S804. In contrast, in a case in which the subject detecting unit 130 does not detect a subject, the camera MPU 125 performs the processing for S803.

In S803, the camera MPU 125 determines whether or not there is a subject tracking command from the user. For example, in a case in which the user has performed a touch operation on the live view image that is displayed on the display device 126, the camera MPU 125 determines that there is a command to track the subject that is in the position for which the touch operation was performed. Note that the subject tracking command by the user may also be performed by operating the operating switch group 127, not just by a touch operation to the display device 126. In a case in which a subject tracking command has been received from a user via the display device 126 or the operating switch group 127, the camera MPU 125 determines that there is a subject tracking command from the user, and performs the processing for S804. In contrast, in a case in which there has not been a subject tracking command from the user, the processing for S809 is performed.

Next, the processing that is executed in the case in which there is a subject tracking state, or for a case in which subject tracking is started will be explained. In S804, the camera MPU 125 determines whether or not tracking is possible for a subject that is being captured as the tracking target. A subject that is being captured as the tracking target is one of a subject that has been detected in S802, a subject that has been detected in S803, or a subject for which current tracking is being continued. In a case in which it is not possible to continue tracking, for example, in a case in which the subject has been hidden by an obstacle, a case in which the subject has left the image capturing angle of view, a case in which there are large changes to the environment relating to brightness or color, or the like, it is not possible to detect the subject and continue tracking. In a case in which it is has been determined that there is a state in which it is possible to continue tracking of the subject, the camera MPU 125 performs the processing for S805. In contrast, in a case in which it has been determined that there is a state in which it is not possible to continue tracking, the camera MPU 125 performs the processing for S809.

In S805, the camera MPU 125 determines whether or not the mode in which AF is performed at the time of subject tracking is set. In a case in which the mode in which AF is performed at the time of subject tracking is set, the camera MPU 125 performs the processing for S806. In contrast, in a case in which the mode in which AF is performed at the time of subject tracking is not set, such as when a mode is set in which AF is always performed, the camera MPU 125 performs the processing for S808. In the case of the mode in which AF is performed at the time of subject tracking, the processing proceeds to S806, and in the case of a mode in which AF is performed regardless of the subject tracking state, the processing proceeds to S808. In S806, the camera MPU 125 performs focus shift suppression determination processing. The details of the focus shift suppression determination processing will be explained below using FIG. 9. During the focus shift suppression determination processing, it is determined if the situation corresponds to the focus shift suppression conditions, or if it does not correspond thereto. Upon completing the focus shift suppression determination processing, the camera MPU 125 performs the processing for S807.

In S807, the camera MPU 125 determines if the state does not correspond to the focus shift suppression conditions based on the results of the focus shift suppression determination processing in S806. In a case in which the state does not correspond to the focus shift suppression conditions, the camera MPU 125 performs the processing for S808. In contrast, in a case in which the state does correspond to the focus shift suppression conditions, the camera MPU 125 performs the processing for S809. In S808, the camera MPU 125 sets the subject tracking state, and completes the subject tracking state setting processing. In S809, the camera MPU 125 sets the non-subject-tracking state, and completes the subject tracking setting processing.

In this manner, during the subject tracking state setting processing, in a case in which it has been determined by the subject detection state and the user subject tracking command state that there is no subject to track, a non-subject-tracking state is set. In contrast, in a case in which there is a subject to track, it fundamentally sets a subject tracking state. However, in the present embodiment, even in a case in which there is a subject to track, in a case in which the state corresponds to the focus shift suppression conditions in a case in which the mode in which AF is performed at the time of subject tracking has been set, control is performed so as to not perform tracking due to the processing from S805 to S807.

Next, the focus shift suppression determination processing that is performed by the camera MPU 125 in S806 will be explained using the flowchart from FIG. 9. In the present embodiment, even when in a state in which subject tracking is possible, in a case in which the mode in which AF is performed at the time of tracking has been set, in a case in which it appears that the subject will leave the frame from the image capturing screen, it is determined that the state corresponds to the focus shift suppression conditions, and it is made such that subject tracking is not performed. Therefore, the focus shift suppression determination processing is processing that is executed in a state in which subject tracking is possible in the case in which the mode in which AF is performed at the time of subject tracking has been set. The focus shift suppression determination processing is processing that determines whether or not it appears that the subject will leave the frame from the image capturing screen based on predetermined conditions, and in which, in a case in which it appears that the subject will leave the frame, it is determined that the state corresponds to the focus shift suppression conditions.

Figure 9:
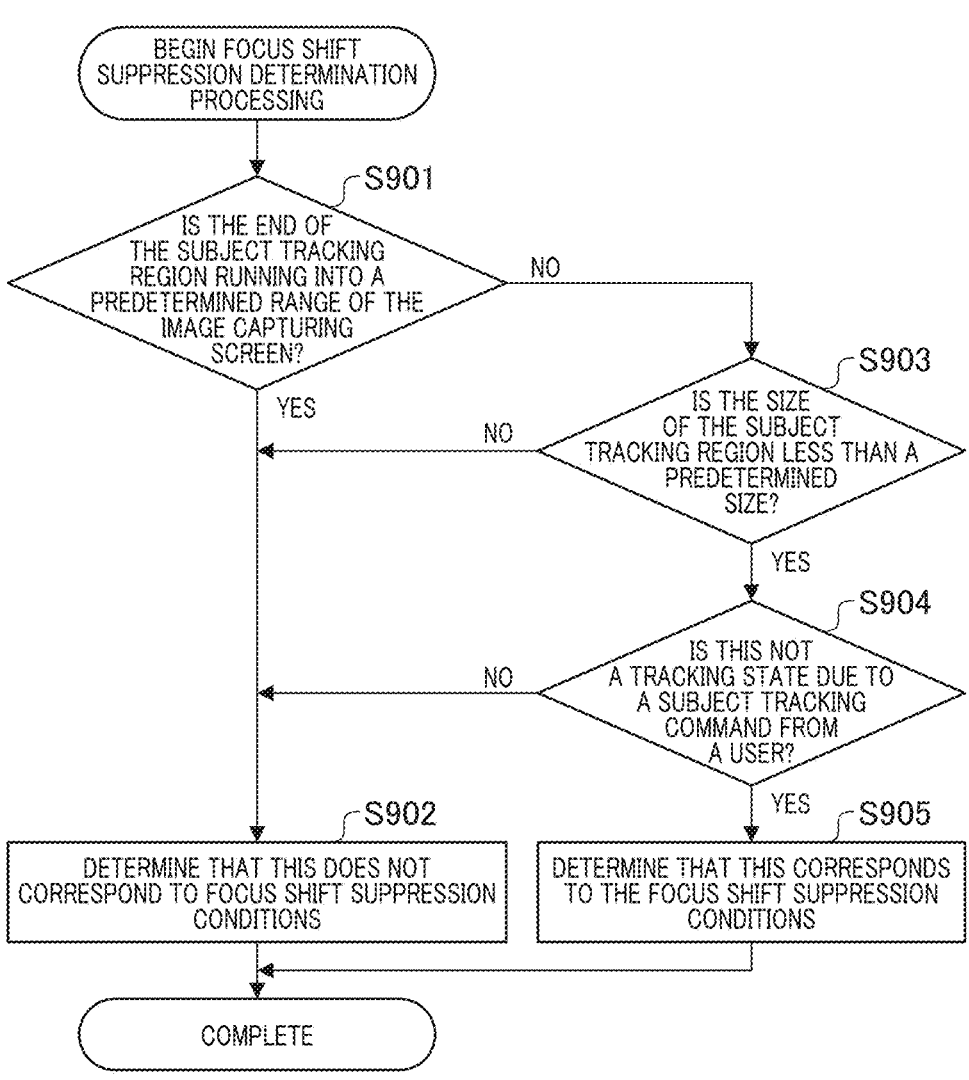
FIG. 9 is a flowchart showing focus shift suppression determination processing in a First Embodiment.

FIG. 9 is a flowchart showing focus shift suppression determination processing in the First Embodiment. In S901, the camera MPU 125 determines whether or not the subject tracking region has run into a predetermined region of the image capturing screen (the image capturing angle of view). In the present embodiment, the predetermined region of the image capturing screen is made an end portion of the image capturing screen (an edge of the image capturing screen, the vicinity of the perimeter). Note that the predetermined region of the image capturing screen may be set as a portion region within the image capturing screen, or it may also be set as a predetermined pixel range from the end of the image capturing screen, that is, as the vicinity region of the perimeter of the image capturing screen. In addition, "running into" is a state in which a portion or the entire region of the subject tracking region is included in the predetermined region. That is, in S901, it is determined whether or not the subject is positioned at the end portion of the image capturing screen and the subject is in a state in which it appears that they might leave the frame. In a case in which the subject tracking region does not run into the predetermined region of the image capturing screen, the camera MPU 125 performs the processing for S902. In contrast, in a case in which the subject tracking region runs into the predetermined region of the image capturing screen, the camera MPU 125 performs the processing for S903. In S902, the camera MPU 125 determines that the state does not correspond to the focus shift suppression conditions, and the current processing is completed.

Even in a case in which the end of the subject tracking regions runs into the end of the image capturing screen, there are uncharacteristic cases in which the user would like to continue the AF processing. In this context, in the present embodiment, cases in which it should be made such that the state does not correspond to the focus shift suppression conditions even in cases in which the end of the subject tracking region runs into the end of the image capturing screen are determined by the processing for S903 and S904. In S903, the MPU 125 determines whether or not the size of the subject tracking region is less than a predetermined size. In the case in which the subject tracking region is positioned in the predetermined region on the end of the image capturing screen, it is determined that the subject is in a state in which it appears that they will leave the frame in cases in which the size of the subject tracking region in the image capturing screen is smaller than the predetermined size. In contrast, a case in which the subject tracking region is positioned in the predetermined region on the end of the image capturing screen, it is determined that the subject is not in a state in which it appears that they might leave the frame in a case in which the size of the subject tracking region inside of the image capturing screen is equal to or larger than the predetermined size. This is because the subject tracking region also becomes larger in a case in which the subject is equal to or greater than a predetermined size, and it becomes easier to run into the end of the image capturing screen regardless of whether or not they leave the frame. In a case in which the size of the subject tracking region is less than the predetermined size, the camera MPU 125 performs the processing for S904. In contrast, in the case in which this is equal to or larger than the predetermined size, the camera MPU 125 performs the processing for S902.

In S904, the camera MPU 125 determines whether or not there is a tracking state due to a subject tracking command from a user. In a case in which there was a subject tracking command from the user, the subject that is intended for the subject tracking is clear due to the user, and therefore, the state does not correspond to the focus shift suppression conditions, and it can be determined that AF processing should be continued. In a case in which there is not a tracking state due to a subject tracking command from a user, such as a case in which a subject that was detected by the subject detecting unit 130 is being automatically tracked, the camera MPU 125 performs the processing for S905. In contrast, in the case of a tracking state by a subject tracking command from a user, the camera MPU 125 performs the processing for S902 In S905, the camera MPU 125 determines that the state corresponds to the focus shift suppression conditions, and completes the present processing.

As has been explained above, during the focus shift suppression determination processing of the present embodiment, whether or not a subject is in a state in which it appears that they will leave the frame is determined based on the position of the subject that is the tracking target, and the size of the tracking region. Furthermore, in a case in which it appears that the subject will leave the frame, when conditions are met in which this is not a tracking state due to a subject tracking command from the user, it is determined in S905 that the state corresponds to the focus shift suppression conditions. In a case in which it has been determined that the state corresponds to the focus shift suppression conditions, the determination for S807 in FIG. 8 is performed, and processing is performed so as to set a non-subject-tracking state even in a case in which subject to be tracked exists in S809.

Note that in the present embodiment, it has been determined whether or not it appears that the subject tracking region will leave the frame based on whether or not the subject tracking region is positioned in a predetermined range that has been set at the end (vicinity of the perimeter of) the image capturing screen. However, the disclosure is not limited thereto. For example, in a case in which the subject tracking region is not positioned in a predetermined region that is one size smaller than the subject tracking region, that is, a predetermined region that includes the central portion of the image capturing screen but does not include the end portion of the image capturing screen, it may also be made such that it is determined that the subject tracking region is in a state in which it may leave the frame.

Figure 10:
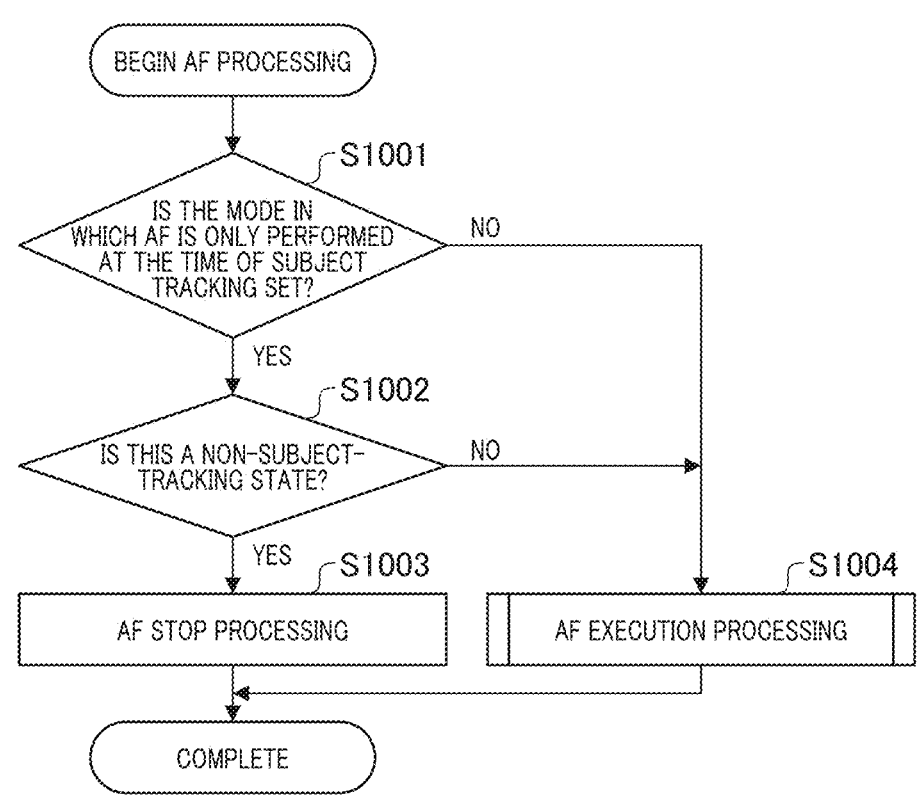
FIG. 10 is a flowchart showing AF processing.
Figure 11:
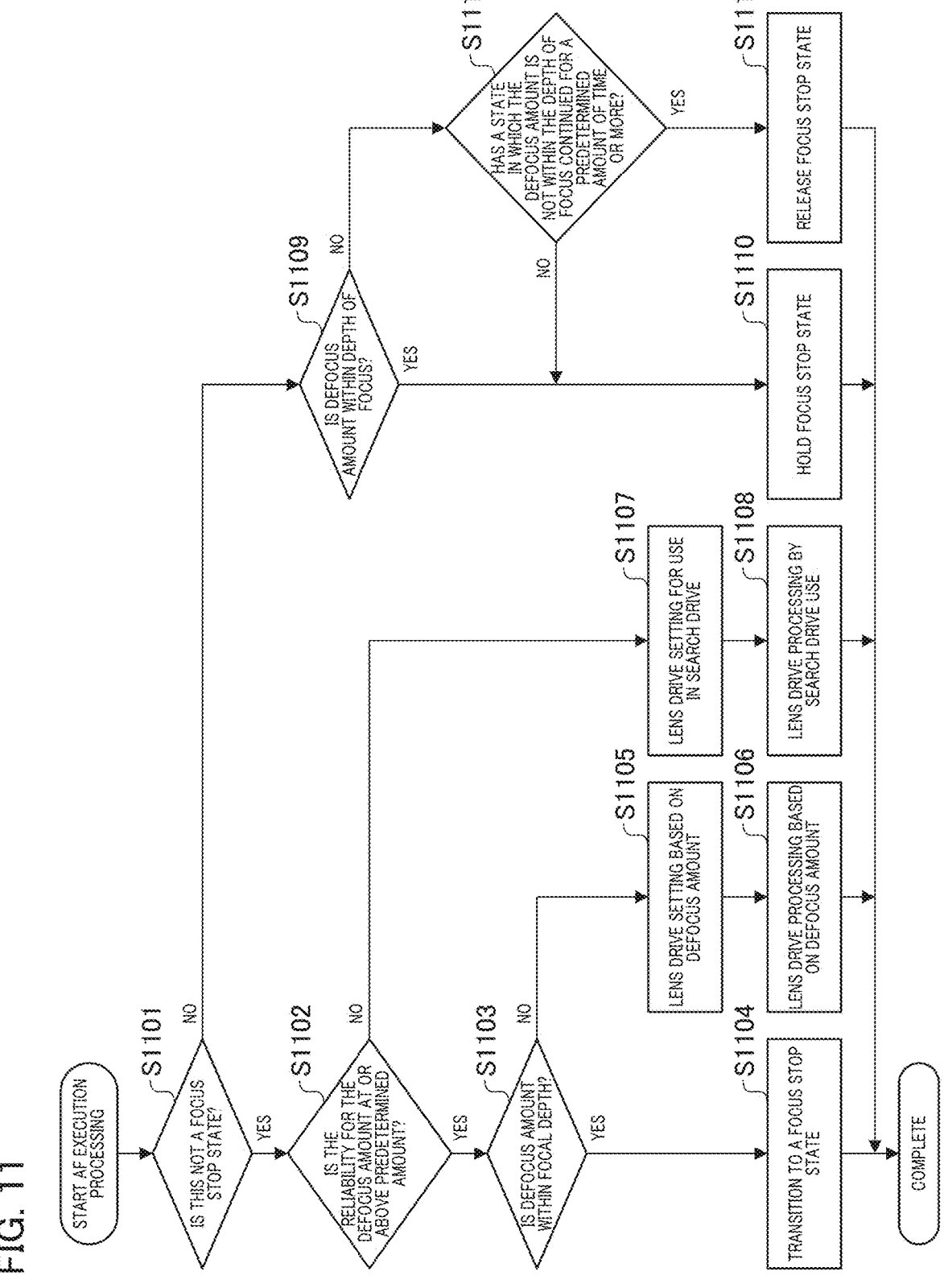
FIG. 11 is a flowchart showing AF execution processing.

Next, the AF processing that is performed by the camera MPU 125 in S706 of FIG. 7 will be explained using the flowcharts in FIG. 10 and FIG. 11. First, during the AF processing that is shown in FIG. 10, whether or not to perform AF is decided, and in a case in which AF processing will be executed, the AF execution processing that is shown in FIG. 11 is performed. In contrast, in a case in which it has been determined that AF processing will not be executed, the AF processing is stopped. During the AF processing, it is decided whether or not AF will be executed based on a mode relating to AF that is set in advance, and the subject tracking state.

FIG. 10 is flowchart showing AF processing. In S1001, the camera MPU 125 determines whether or not the mode in which AF is performed at the time of subject tracking is set. The mode in which AF is performed at the time of subject tracking is a focus adjustment mode in which focus adjustment is performed in the tracking position in a case in which a specific subject is being tracked, and in which focus adjustment is not performed in a case in which tracking is not being performed. In a case in which the mode in which AF is performed at the time of subject tracking has been set, the camera MPU 125 performs the processing for S1002. In contrast, in the case in which the mode in which AF is performed at the time of subject tracking is not set, that is, in a case in which the mode in which AF is performed regardless of the subject tracking state has been set, the camera MPU 125 performs the processing for S1004.

In S1002, the camera MPU 125 determines whether or not there is a non-subject-tracking state. In the case of a non-subject-tracking state, the camera MPU 125 performs the processing for S1003. In contrast, in the case of a subject tracking state, the processing for S1004 is performed. In S1003, the camera MPU 125 performs AF stop processing, and the AF processing is completed. During S1004, the camera MPU 125 performs AF execution processing, and the AF processing is completed. The details for the AF execution processing will be explained below.

Next, the AF execution processing performed by the camera MPU 125 in S1004 of FIG. 10 will be explained using the flowchart in FIG. 11. FIG. 11 is a flowchart showing the AF execution processing. In S1101, the camera MPU 125 determines whether or not there is a focus stop state by AF. In a case in which there is not a focus stop state, the camera MPU 125 performs the processing for S1102. In contrast, in a case in which there is a focus stop state, the camera MPU 125 performs the processing for S1109.

In S1102, the camera MPU 125 determines whether or not the reliability of the defocus amount is at or above a predetermined level. The camera MPU 125 determines whether or not the reliability of the defocus amount is at or above a predetermined level based on the information for the reliability of the defocus amount that was calculated by the focus detecting unit 129 in S705. In this context, in one embodiment, if the reliability threshold for the defocus amount that is set in S1102 is set as the highest value for the reliability range in which not only the defocus amount that has been calculated but also the defocus direction are not reliable. Note that the reliability for the defocus amount may be found by using both the two-image degree of agreement and the sharpness of the image deviation amount, or it may also be found using just one of these. In addition, other indices such as the signal level or the like may also be used as the reliability of the defocus amount. In a case in which the reliability for the defocus amount is at or above the predetermined level, the camera MPU 125 performs the processing for S1103. In contrast, in a case in which the reliability for the defocus amount is not at or above the predetermined level, the camera MPU 125 performs the processing for S1107.

In S1103, the camera MPU 125 determines whether or not the defocus amount is within the depth of focus. In a case in which the defocus amount is within the depth of focus, that is, in a case in which this can be deemed to be a focus state, the camera MPU 125 performs the processing for S1104. In contrast, in a case in which the defocus amount is not within the depth of focus, that is, in a case in which this can be deemed to be a non-focus state, the camera MPU 125 performs the processing for S1105. In S1104, the camera MPU 125 transitions to a focus stop state, and the AF execution processing is completed.

In a non-focus state, in a case in which the reliability for the defocus amount is at or a above the predetermined level, the camera MPU 125 performs processing to drive the focus lens 104 based on the defocus amount. In S1105, the camera MPU 125 performs lens drive setting for driving the focus lens 104 based on the defocus amount that was calculated by the focus detecting unit 129 in S705. Upon the information for driving the focus lens 104 being set by the lens drive setting, the camera MPU 125 performs the processing for S1106. In S1106, the camera MPU 125 transmits a drive command for the focus lens 104 to the lens MPU 117 based on the defocus amount and the information for the lens drive settings that was set in S1105. The lens MPU 117, which has received a drive command for the focus lens 104 from the camera MPU 125 performs control to drive the focus lens 104 based on the defocus amount and the information for the lens drive settings that were received. Upon the focus lens 104 being driven to the focus position by the focus control, the AF execution processing is completed.

In a non-focus state, in a case in which the reliability of the defocus amount is less than the predetermined level, the camera MPU 125 cannot use the defocus amount, for which the reliability is low, to drive the focus lens 104. In this context, the camera MPU 125 performs processing to make the focus lens 104 perform a search drive. A search drive is processing in which the defocus amount is calculated while moving the focus lens 104 towards the movable edge thereof in order to detect a position for the focus lens 104 in which a defocus amount with a high reliability can be obtained. In S1107, the camera MPU 125 performs lens drive setting for use in the search drive. As the lens drive setting for use in the search drive, the camera MPU 125 sets a drive speed of the focus lens 104, a direction in which the drive will be started, and the like. In S1108, the camera MPU 125 transmits a control command for the focus lens 104 to the lens MPU 117 based on the lens drive settings for use in the search drive that were set in S1107. The lens MPU 117, which has received the control command for the focus lens 104 from the camera MPU 125, performs control to drive the focus lens 104 based on the control command. Upon the focus lens 104 being driven to the focus position by the search drive, the AF execution processing is completed.

In the case of a focus stop state, the camera MPU 125 determines whether to continue or release the focus stop state based on the defocus amount and the amount of time that has passed. In S1109, the camera MPU 125 determines whether or not the defocus amount that was calculated by the focus detecting unit 129 in S705 is within the focal depth. In a case in which this is within the focal depth, the camera MPU 125 performs the processing for S1110. In contrast, in a case in which this is not within the focal depth, the camera MU 125 performs the processing for S1111. In S1110, the camera MPU 125 maintains the focus stop state, and the AF execution processing is completed.

In S111, the camera MPU 125 determines whether or not a state in which the defocus amount is not within the focal depth has continued for a predetermined amount of time. In a case in which a state in which the defocus amount is not within the focal depth has continued for the predetermined amount of time, the camera MPU 125 performs the processing for S112. In a case in which a state in which the defocus amount is not within the focal depth has not continued for the predetermined amount of time, the camera MPU 125 performs the processing for S1110. In S1112, the camera MPU 125 releases the focus stop state, and the AF execution processing is completed. In a case in which a state in which the defocus amount is not within the focal depth has continued for the predetermined period of time, by releasing the focus stop state, it becomes possible to have the focus lens 104 adhere to a focus change during the next AF execution processing, and to make this a focus state.

Figure 12A:
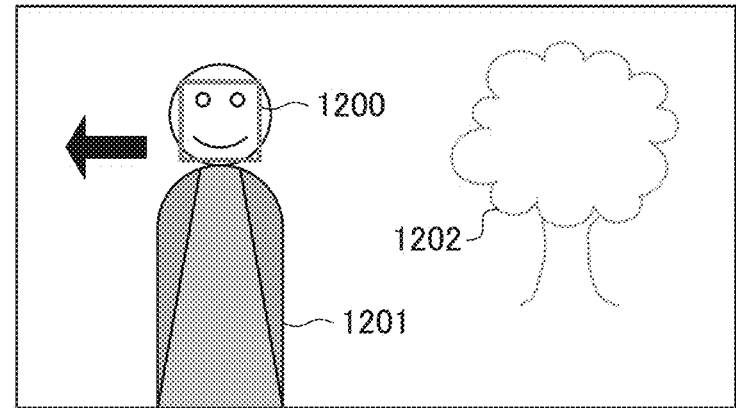
FIGS. 12A to 12C are diagrams explaining an AF mode.
Figure 12B:
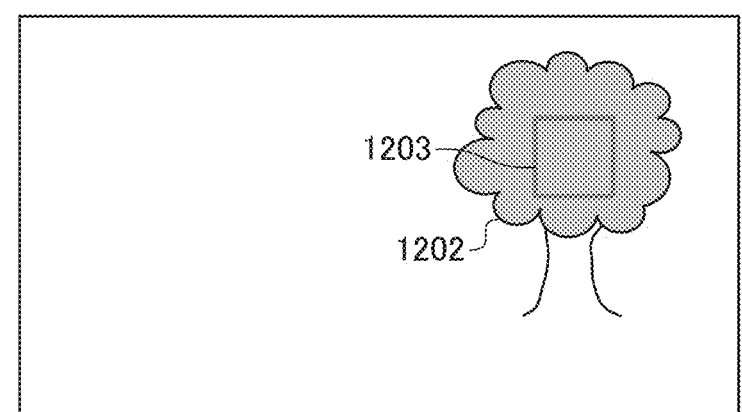
Figure 12C:
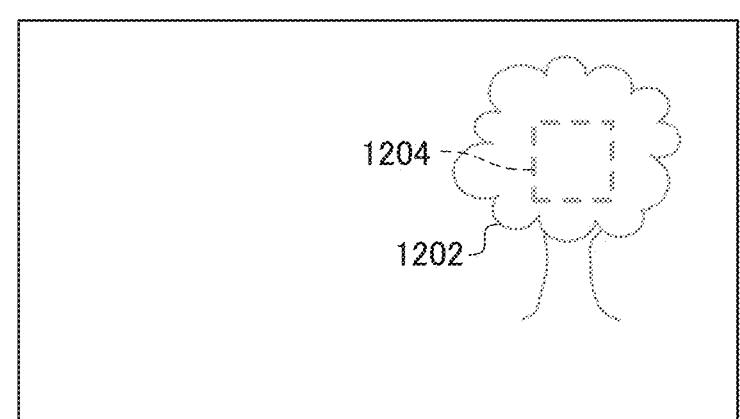

FIG. 12A to FIG. 12C are diagrams explaining AF mode. FIG. 12A to FIG. 12C show captured images. FIG. 12A shows a scene in which in an image capturing screen, there is a person 1201 who is at a closer subject distance, and a tree 1202 that is at a farther subject distance. FIG. 12B and FIG. 12C show scenes in which the person has left the frame of the image capturing screen from the state in FIG. 12A. It is assumed that FIG. 12A is in a state in which the facial region of the person 1201 that was detected by the subject detecting unit 130 is made the subject tracking region 1200, the person 1201 is in focus, and the tree 1202 that is at the farther distance is out of focus. In a case in which a mode in which AF is performed regardless of the subject tracking state has been set, when the person 1201 leaves the frame and the subject detection target is no longer within the image capturing screen, as is shown in FIG. 12B, the focus will move to the tree 1202, which has contrast within the screen. As a specific example, the tree is brought into focus by receiving that the state has become a non-subject-tracking state in S809, the tree 1202, which has contrast within the screen, being set as the AF region 1203 by the AF region setting processing for S704, and the AF execution processing for S1004 being performed. In contrast, upon the person leaving the frame and there no longer being a subject detection target within the image capturing screen in a case in which the mode is set in which AF is performed at the time of subject tracking, as is shown in FIG. 12C, the focus state will be maintained in the vicinity of the focus from when the person 1201 left the frame. As a specific example, although it is received that subject tracking has been started in S809, and the tree 1202 is set as the AF region 1204 during the AF region setting processing of 704, in S1002 it is determined to be a non-subject-tracking state, and therefore, AF stop processing is performed in S1003. In this manner, in the mode that performs AF at the time of subject tracking, it is possible to maintain the focus state on the vicinity of the focus from when the subject left the frame when the state changes from FIG. 12A to FIG. 12C.

Figure 13A:
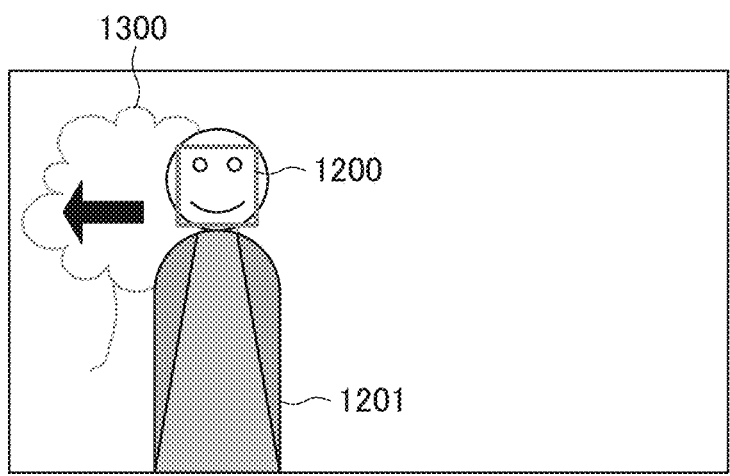
FIGS. 13A to 13C are diagrams explaining undesirable focus shift in a mode that performs AF at the time of subject tracking.
Figure 13B:
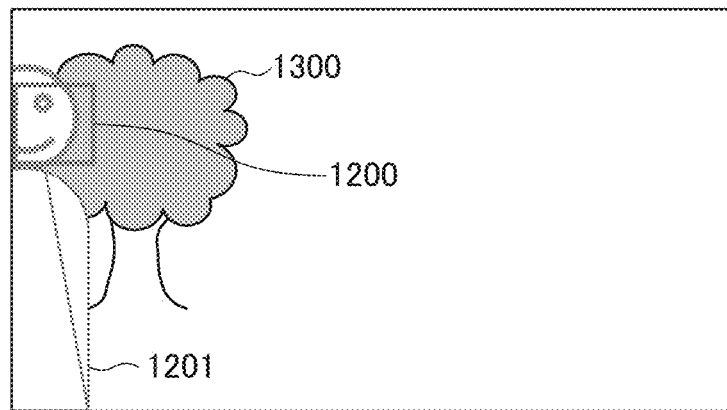
Figure 13C:
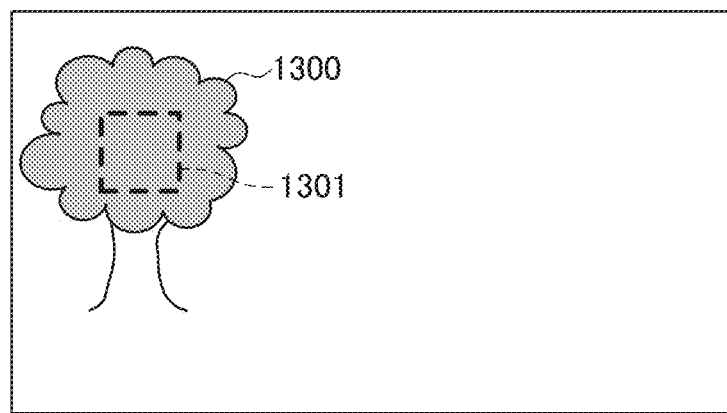

In the mode that performs AF at the time of subject tracking, in one embodiment, the focus state from when the subject that is being tracked left the frame is maintained. However, there are cases in which when the subject leaves the frame, the focus shifts to another subject that is not the tracking target. Examples of undesirable focus shift in the mode in which AF is performed at the time of subject tracking will be explained using FIG. 13A to FIG. 13C. FIG. 13A to 13C are diagrams explaining undesirable focus shift in the mode in which AF is performed at the time of subject tracking. FIG. 13A to FIG. 13C show captured images. FIG. 13A shows a scene in which, in the image capturing screen, there is a person 1201 who is at a closer subject distance, and there is a tree 1300 that is at a farther subject distance. FIG. 13A, FIG. 13B, and FIG. 13C show in order states in which the person 1201, who is the tracking target, gradually leaves the frame. The tree 1300 is positioned in the vicinity of the position in which the person 1201 leaves the frame. At the point in time that is shown in FIG. 13A, there is a state in which the person 1201 is in focus, and the tree 1300, which is at a farther distance, is out of focus.

FIG. 13B shows the state directly before the person 1201 leaves the frame to outside of the image capturing screen. There is the tree 1300, which is a subject that is different from the tracking target, at a distance on the far side of the vicinity of the position in which the person 1201, who is the subject that is the tracking target, left the frame to outside of the image capturing screen. Directly before they leave the frame, a portion of the person 1201 is outside of the image capturing screen. Subject tracking and AF can be performed inside of the image capturing screen. Therefore, the subject tracking region 1200, which has been set as the facial region of the person 1201, is positioned so as to be stopped in a state in which it is running into the end of the image capturing screen, and a deviation occurs in the range for the face of the person 1201 and the subject tracking region 1200. When a subject that is different from the subject that is the tracking target is added into the region for the subject tracking region 1200 for which a deviation has occurred, a state is created in which there is a perspective conflict with subjects having different subject distances being mixed in the subject tracking region 1200, which is the region in which AF is performed. When there is a perspective conflict, there are cases in which focusing is performed on a subject that is different from the subject that is the tracking target on which the image capturing apparatus should focus due to the state of the image capturing optical system, such as the distance relationship between each of the subjects, the strength of the contrast, the aperture, the focus distance, and the like. In the example that is shown in FIG. 13B, the person 1201, who is the range tracking subject for the subject tracking region 1200, and the tree 1300 are mixed, and a state is shown in which the tree 1300, which is at a farther distance, has been brought into focus instead of the person 1201.

FIG. 13C shows a state in which the person 1201 has left the frame to outside of the image capturing screen, and the subject detection target is no longer inside of the image capturing screen. In the mode in which AF is performed at the time of subject tracking, it is expected that the state in which the focus is blurred on the tree 1300, which is at a farther distance, will be maintained when the person 1201 leaves the frame. However, in a case in which the tree 1300, which is at a farther distance in a state in which there is already a perspective conflict for the subject, has been brought into focus, this becomes a state in which the AF region 1301 that has been set on the tree 1300 is brought into focus even after the person 1201 leaves the frame to outside of the image capturing screen. In this manner, when the subject that is the tracking target leaves the frame, there are case in which this does not become the focus state that was expected in the mode in which AF is performed at the time of subject tracking due to an unintended focus control. In this context, in the present embodiment, in a case that corresponds to the focus shift suppression conditions, unintended focus control in the mode in which AF is performed at the time of subject tracking is suppressed by stopping AF by stopping subject tracking even in a case in which a subject tracking target exists.

In the mode in which AF is performed at the time of subject tracking, in order to suppress AF control that will focus on an unintended subject, in the present embodiment, it is determined whether or not the mode in which AF is performed at the time of subject tracking is set in S805, and focus shift suppression determination processing is performed in S806. In addition, in a case in which the results of the focus shift suppression determination processing correspond to the focus shift suppression conditions, AF stop processing is performed in S1003 by setting a non-subject-tracking state in S809 even in a case in which a subject tracking target exists.

Figure 14A:
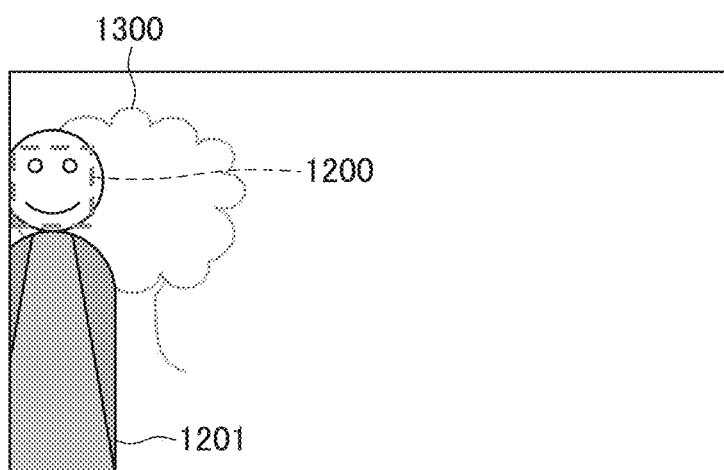
FIGS. 14A to 14C are diagrams explaining focus control in the First Embodiment.
Figure 14B:
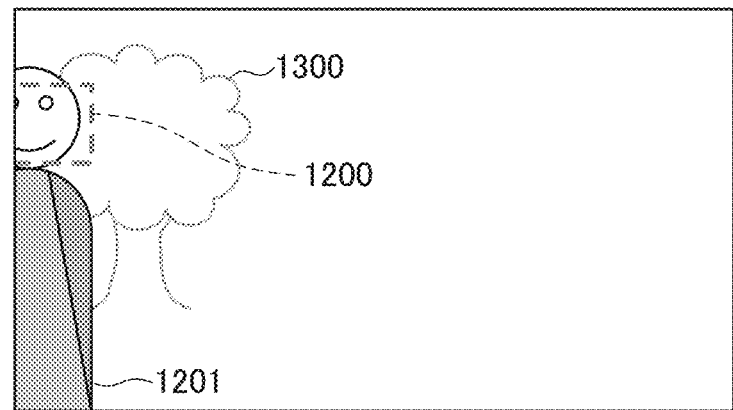
Figure 14C:
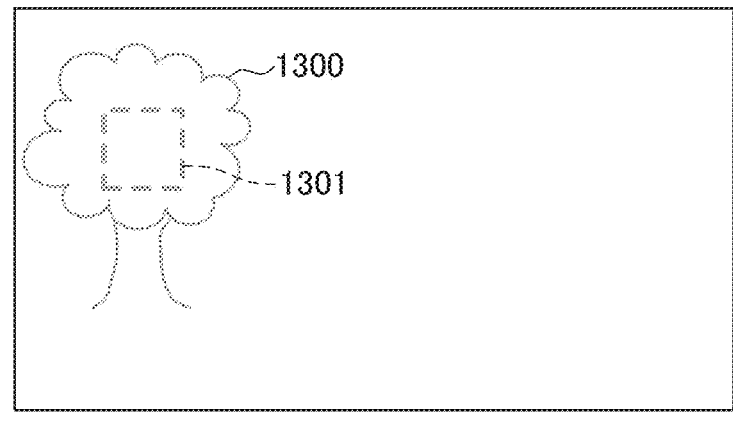

FIG. 14A to 14C are images explaining the focus control in the present embodiment. FIG. 14A to FIG. 14C show captured images. FIG. 14A to FIG. 14C show a state in which the person 1201 who is the tracking target gradually leaves the frame from the state in FIG. 13A. FIG. 14A shows a state in which after the state in FIG. 13A, a state in which the subject tracking region 1200 runs into the end of the image capturing screen has occurred. In the present embodiment, in S901, whether or not the end of the subject tracking region is running into a predetermined range of the image capturing screen (for example, the end of the image capturing screen) is determined. In the state that is shown in FIG. 13A, the subject tracking region 1200 is not running into the end of the image capturing screen, and therefore, in S902, it is determined that the state does not correspond to the focus shift suppression conditions based on the determination from S901. In addition, the tracking state is set in S808 by way of the determination from S807, and a subject tracking state is determined in S1002, and therefore, AF execution processing is executed in S1004. In contrast, in the state that is shown in FIG. 14A, the subject tracking region is running into the end of the image capturing screen, and therefore, the processing for S903, and S904 is performed based on the determination from S901. In the case that both S903 and S904 correspond to the focus shift suppression conditions, it is determined in S905 that the state corresponds to the focus shift suppression conditions. In addition, a non-subject-tracking state is set in S809 by way of the determination from S807, and a non-subject-tracking state is determined in S1002, and therefore, AF stop processing is executed in S1003.

FIG. 14B shows a state in which after the state in FIG. 14A, the person 1201 has further left the frame. The positional relationship between the person 1201 and the tree 1300 in the image capturing screen that is shown in FIG. 14B is the same as the state for the image capturing screen that is shown in FIG. 13B. In FIG. 13B, the focus shifted to the tree 1300, which is on the far side, due to a perspective conflict. However, in FIG. 14B, AF stop processing has already been performed in S1003, and therefore, focus shift due to a perspective conflict does not occur, and the state in which the focus is blurred on the tree 1300 is maintained.

FIG. 14C shows a state in which after the state from FIG. 14B, the person 1201 has further left the frame and is no longer inside of the image capturing screen. AF is still being stopped by the AF stop processing, and therefore, the AF region 1301, which has been set as the tree 1300, is not brought into focus, and it is possible to maintain a state in which the focus is blurred on the tree 1300, that is, the state that is expected in the mode in which AF is performed at the time of subject tracking. Note that there are also cases in which the state changes to a state in which the subject tracking region is not running into the end of the image capturing screen, which is shown in FIG. 13A, from a state in which the subject tracking region 1200 is running into the end of the image capturing screen, which is shown in FIG. 14A and FIG. 14B, due to the tracking subject entering the frame. In such a case, in S901 the subject tracking region changes to a state in which it is not running into the end of the image capturing screen, and therefore, this does not correspond to the focus shift suppression conditions in S902, and it is possible to re-set this to a subject tracking state in S808.

In this manner, in the present embodiment, as is shown in FIG. 14A to FIG. 14C, upon the subject tracking region running into the end of the image capturing screen, AF stop processing is performed by determining that the state corresponds to the focus shift suppression conditions and setting this as a non-subject-tracking state, and it is possible to realize a control that suppresses focus shift. It thereby becomes possible to maintain the focus state from when the subject that is being tracked left the frame when they leave the frame, which is the AF control that is intended in the mode that performs AF at the time of subject tracking.

In the determination of whether or not the state corresponds to the focus shift suppression conditions, in addition to the determination from S901 as to whether or not the subject tracking region is running into the end of the image capturing screen, the size of the subject tracking region, and commands from the user may also be used as the determination materials. In the present embodiment, even in a case in which the subject tracking region is running into the end of the image capturing screen, in a case in which the size of the subject tracking region is at or above a predetermined size, the state does not correspond to the focus shift suppression conditions (S902). In addition, even in a case in which the subject tracking region is running into the end of the image capturing screen in a case in which there is a tracking state due to a subject tracking command from the user, the state does not correspond to the focus shift suppression conditions (S903). A case in which even if the subject tracking region is running into the end of the image capturing screen, this uncharacteristically does not correspond to the focus shift suppression conditions will be explained using FIG. 15 to FIG. 16B.

Figure 15:
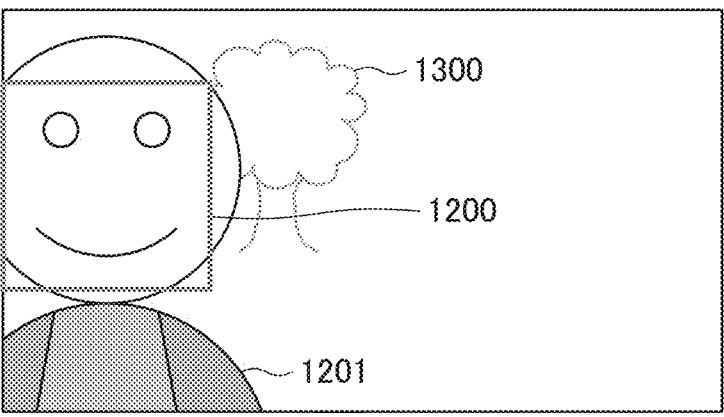
FIG. 15 is a diagram showing one example of a captured image for a case in which a size of a subject tracking region is equal to or greater than a predetermined size.

FIG. 15 is a diagram showing one example of a captured image for a case in which the size of the subject tracking region is at or above a predetermined size. As is shown in FIG. 15, in conditions such as when the size for the detection of the person 1201, for whom the image capturing distance is close, and who is the image capturing subject, becomes large, there is a possibility that cases in which the end of the subject tracking region runs into the end of the image capturing screen will frequently occur. In a case in which the end of the subject tracking region runs into the end of the image capturing screen because the subject is too close to the image capturing apparatus 10 in this manner, different than in cases in which the person 1201 leaves the frame, in one embodiment, a state in which the focus follows the person 1201 is maintained. In addition, when the detection subject is at a close distance, there are many cases in which due to optics, the degree of image blur for the subject that is at a farther distance than the person will become large, and the contrast will decrease, that is, cases in which it becomes easier to maintain the focus on the detection subject even if there is a perspective conflict. In this context, in the present embodiment, even in cases in which the end of the subject tracking region runs into the end of the image capturing screen, in S903, it is determined whether or not the size of the subject tracking region is less than a predetermined size, and in a case in which this is at or above the predetermined size, this is made to not correspond to the focus shift suppression conditions in S902. Note that the threshold for the size may also be made so as to change according to the type and position of the subject that is detected, or the like.

Figure 16A:
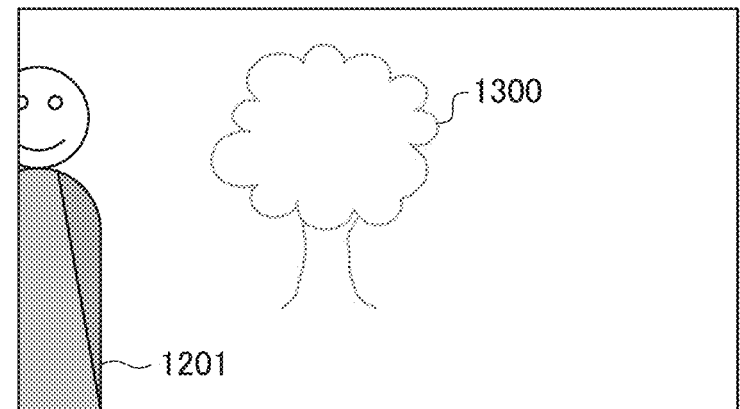
FIGS. 16A and 16B are diagrams explaining a subject tracking command from a user.
Figure 16B:
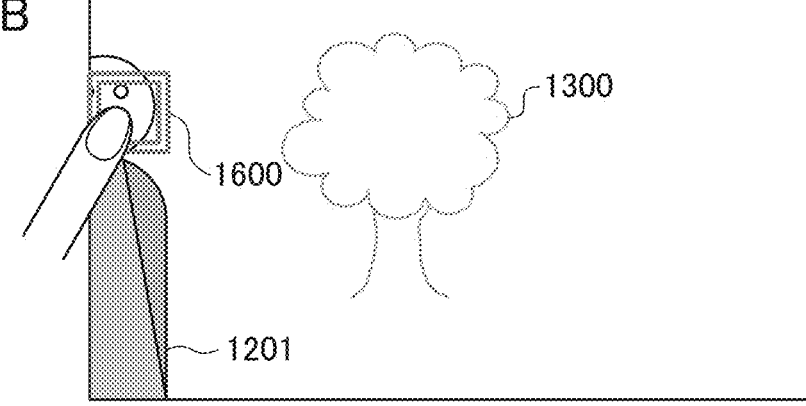

FIG. 16A and FIG. 16B are diagrams explaining subject tracking commands by the user. FIG. 16A shows a state in which, in the mode in which AF is performed at the time of subject tracking, the end of the subject tracking region is running into the end of the image capturing screen. If it is determined that the state corresponds to the focus shift suppression conditions and AF stop processing is executed in this state, in a case in which the image capturing distance for the person 1201 changes at the end of the image capturing screen, the focus on the person 1201 can no longer be adhered to, and the focus on the person 1201 will blur. In this context, in the present embodiment, in a case in which it is clear for which subject tracking is intended, it is made such that the state does not correspond to the focus shift suppression conditions, and AF processing is continued. In this context, the subject for which it is clear that the subject tracking is intended is, for example, a subject for which there has been a subject tracking command from the user in S803. FIG. 16B shows a case in which a subject tracking command is performed by the user by a touch operation. The user performs a tracking command for a specific subject by touching this subject in a captured image that has been displayed on the touch panel of the display device 126 of the image capturing apparatus 10. In the example that is shown in FIG. 16B, the subject tracking region 1600 is set on the corresponding region by the user touching the facial portion of the person 1201. In this manner, in the present embodiment, even in cases in which the end of the subject tracking region is running into the end of the image capturing screen, in S902, the state is made to not correspond to the focus shift suppression conditions by determining whether or not this is a tracking state due to a subject tracking command from the user in S904. Note that as an example of a subject for which it is clear that tracking is intended, an explanation has been given for a subject for which the user has performed a subject tracking command, however, this is not limited thereto. For example, a specific subject that has been authenticated as the tracking subject by an authentication means from among the subjects that have been detected by the subject detecting unit 130 may be made the subject for which it is clear that tracking is intended, and it may be made such that the AF processing is not released.

As has been explained above, in the present embodiment, in the mode in which AF is performed at the time of subject tracking, in a case in which the end of the subject tracking region is running into a predetermined region of the image capturing screen, even if there is a state in which a subject can be detected, the AF is stopped without continuing the subject tracking. It is thereby possible to suppress states in which a different subject is brought into focus due to a perspective conflict, which can occur when the subject leaves the frame from the image capturing region and the AF range finding region in the mode in which AF is performed at the time of subject tracking. In addition, it is also possible to continue subject tracking and adhere to the focus in cases in which the size of the subject is large, or cases in which it is thought that it would be better to prioritize the adherence of the focus to the subject that is being tracked, such as when the user has performed a subject tracking command, or the like. Therefore, it becomes possible to suppress unintended AF control during AF control that tracks a subject. Note that in relation to the subject tracking state, in cases in which a subject is continuously detected after the subject has been detected, it is possible to apply the contents of the disclosure regardless of states such as cases in which the subject is no longer detected after having been detected, and the tracking is being performed based on color information, or the like.

Second Embodiment

In the First Embodiment, as was shown in FIG. 9, in addition to determining whether or not the subject tracking region is running into the end of the image capturing screen, it was determined whether or not the conditions corresponded to the focus shift suppression conditions based on the size of the subject tracking region, and the presence or absence of a subject tracking command from the user. In the Second Embodiment, further additional conditions will be added to the determination conditions from the First Embodiment, and whether or not the state corresponds to the focus shift suppression conditions will be determined. Below, the focus shift suppression determination processing in the Second Embodiment will be explained. Note that in the Second Embodiment, explanations of configurations that are the same as those in the First Embodiment will be omitted.

Figure 17:
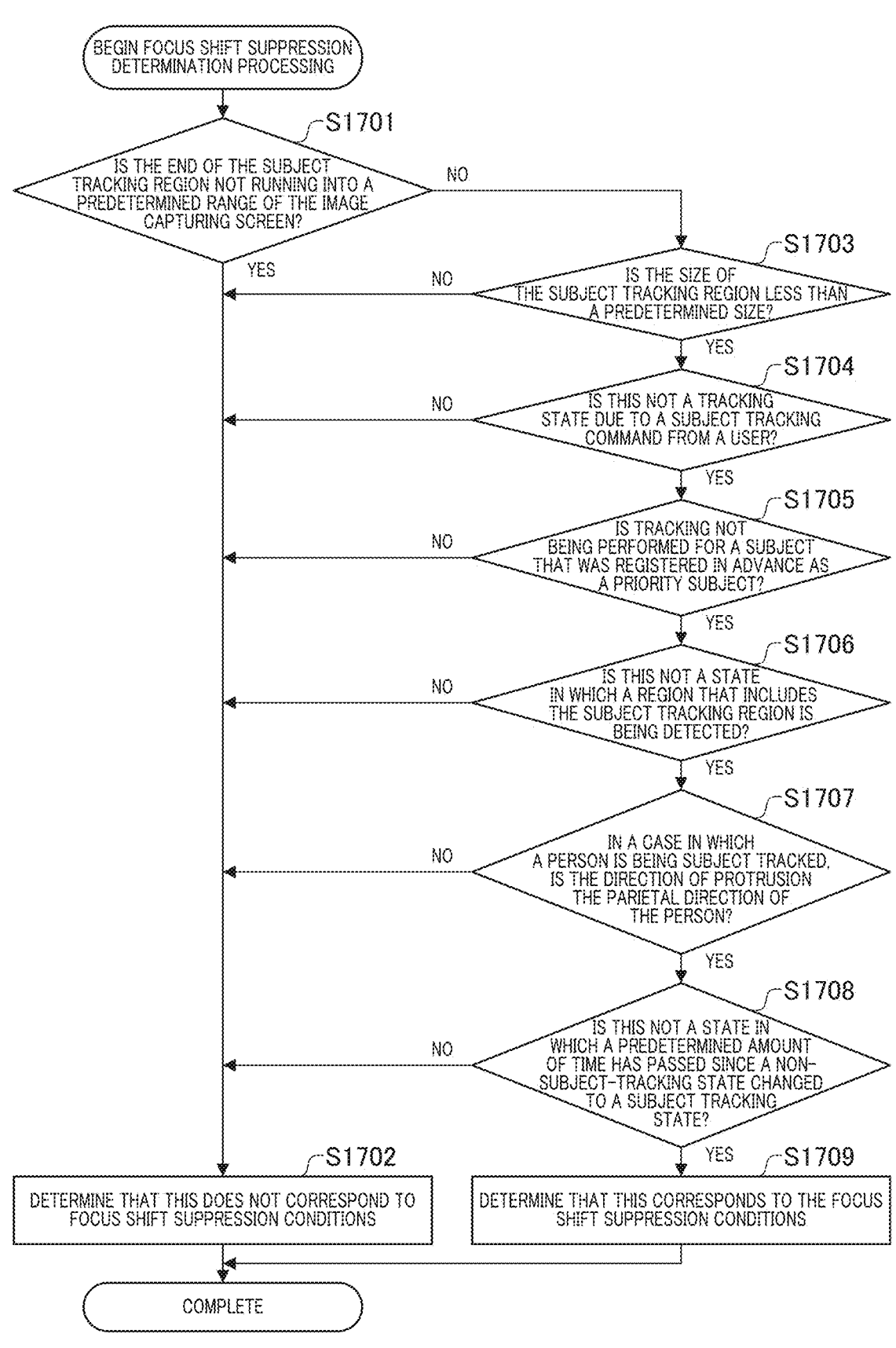
FIG. 17 is a flowchart showing focus shift suppression determination processing in a Second Embodiment.

FIG. 17 is a flowchart showing the focus shift suppression determination processing in the Second Embodiment. The focus shift suppression determination processing is the processing performed by the camera MPU 125 in S806. Each processing that is shown in FIG. 17 is realized by the processor in the camera MPU 125 of the camera body 120 reading out and executing an image capturing processing program from a memory such as the ROM 125a or the like. The processing from S1701 to S1704, and in S1709 of FIG. 17 is the same as the processing from S901 to S904, and in S905 of FIG. 9, and therefore, an explanation thereof will be omitted.

In S1705, the camera MPU 125 determines whether or not a subject that was registered in advance as a priority subject is being tracked. This is in order to continue the AF processing in a case in which the subject that is being tracked is a priority subject. In the present embodiment, the camera MPU 125 has a function in which before performing video image capturing, information relating to a subject that the user would like to prioritize in the image capturing is registered in the EEPROM 125c in advance, and the camera MPU 125 functions as a subject registering unit. When the subject detecting unit 130 has detected a subject, the camera MPU 125 determines whether or not a subject that conforms to the information that has been registered as the priority subject is being detected. In a case in which a subject that conforms to the information that has been registered as the priority subject is being detected, even in a case in which, for example, a plurality of subjects have been detected, control is performed such that the subject tracking is executed so as to prioritize the subject that has been registered. Using FIG. 16B, an explanation was given of performing a determination to prioritize adhering to the focus state for a subject for which it is clear that the user intends tracking to be performed in a case in which subject tracking is being performed due to a touch operation, that is, due to a user command. In the present embodiment, adhering to the focus state is also prioritized with the subject that has been registered as the priority subject serving as the subject for which it is clear that the user intends tracking to be performed. In a case in which the subject that is being tracking is not the subject that has been registered as the priority subject, the camera MPU 125 performs the processing for S1706. In contrast, in a case in which the subject that is being tracked is the subject that has been registered as the priority subject, the camera MPU 125 performs the processing for S1702.

Figure 18A:
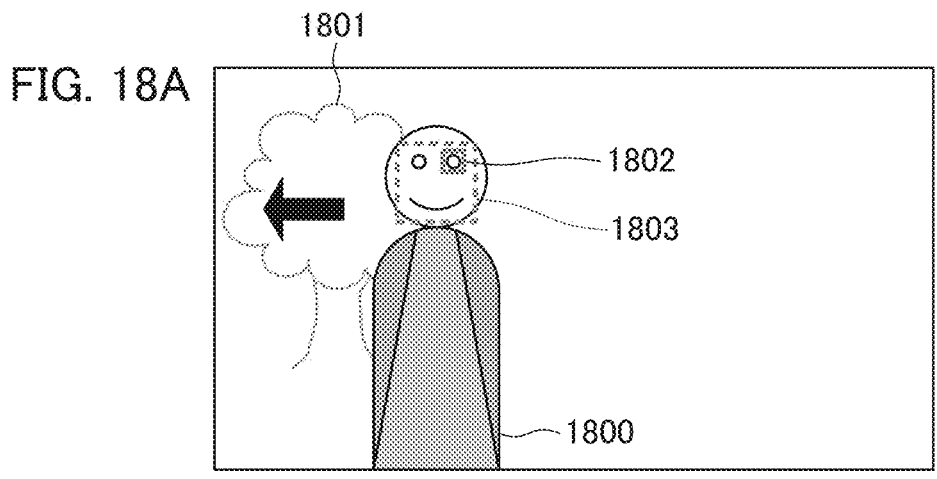
FIGS. 18A to 18C are diagrams explaining pupil detection.

In S1706, the camera MPU 125 determines whether or not there is a state in which a region that includes the subject tracking region is being detected. In this context, a region that includes the subject tracking region will be explained using FIG. 18A to FIG. 18C. FIG. 18A to FIG. 16C are diagrams that explain pupil detection. In FIG. 18A, a person 1800 is positioned at a closer distance than a tree 1801. The subject detecting unit 130 is able to detect a specific body part for which there is a high demand to perform focusing on, such as a pupil. In addition, the camera MPU 125 can set a pupil as the subject tracking region. Additionally, the subject detecting unit 130 can detect an entire face that includes a pupil. In a case in which a region that is more included is detected, even if this is for the same person, the camera MPU 125 makes the included region the subject tracking region, and controls this as the AF target. That is, in the case of a person, it is possible to switch the subject tracking region such that in a case in which a pupil can be detected, this is made the pupil, and in a case in which the pupil cannot be detected, this is made the entire face. In FIG. 18A, the subject tracking region that corresponds to the pupil of the person 1800 is made the first subject tracking region 1802, and the subject tracking region that corresponds to their face is made the second subject tracking region 1803. In FIG. 18A, in which the first subject tracking region 1802 and the second subject tracking region 1803 can be detected, the first subject tracking region 1802 that corresponds to the pupil that serves as the subject tracking region is set as the target on which AF is performed.

Figure 18B:
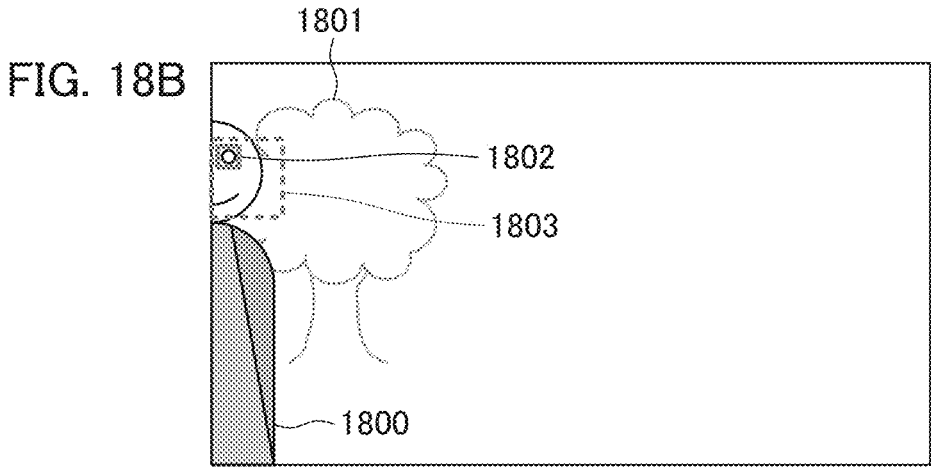

In FIG. 18B, a state is shown in which, after the state in FIG. 18A, a portion of the person 1800 leaves the frame. In the state in FIG. 18B, the first subject tracking region 1802, which is set as the subject tracking region, runs into the image capturing screen. Therefore, in S1701 of FIG. 17, it is determined that the subject tracking region is running into the end of the image capturing screen. However, it can be thought that even if an included region runs into the end of the image capturing screen, a region exists in which this is included in the surroundings of the included region, just as how the face exists around the pupil. In FIG. 18B, the region for the entire face, which is the region including the pupil can also be detected, and the possibility of the focus being taken over by the tree 1800, which exists behind this, due to a perspective conflict is low. In this manner, in states in which it can be thought that the possibility of an unintended focus shift occurring due to a perspective conflict is low, the state does not correspond to the focus shift suppression conditions, and therefore, in the present embodiment, a state in which a region that includes the subject tracking region is detected is made to not correspond to the focus shift suppression conditions.

Figure 18C:
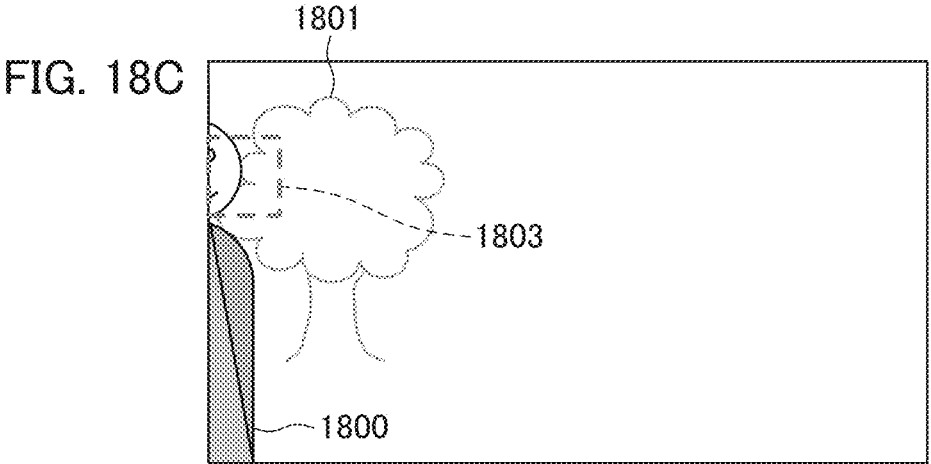

FIG. 18C shows a state in which a portion of the person 1800 has further left the frame from the state in FIG. 18B. In the state in FIG. 18C, it is no longer possible to detect the pupil of the person 1800. In a case in which, in this manner, a first subject tracking region 1802 that is included in the second subject tracking region 1803 does not exist, it can be thought that there is a possibility that the focus will shift to the tree 1801 due to a perspective conflict. In this context, in the present embodiment, in a case in which a region that includes the subject tracking region is not detected, it is determined that the state can correspond to the focus shift suppression conditions. In this manner, in a case in which it has been determined that this is not a state in which a region that includes the subject tracking region is being detected, the camera MPU 125 performs the processing for S1707. In contrast, in a case in which it has been determined that this is a state in which a region that includes the subject tracking region is being detected, the camera MPU 125 performs the processing for S1702.

An example has been explained in FIG. 18A to FIG. 18C in which the pupil and the face of a person are given as examples of regions that include the subject tracking region, however the disclosure is not limited thereto. For example, this may also be a region in which a face is included, or a region that includes an entire body. In addition, it is also possible to set a plurality of subject tracking regions other than a person, such as an animal, a vehicle, or the like, and it is possible to determine the presence or absence of a region that includes a subject tracking region. An example in which the subject is an animal will be explained using FIG. 19A to FIG. 20B, and an example in which the subject is a vehicle will be explained using FIG. 21A to FIG. 21B.

Figure 19A:
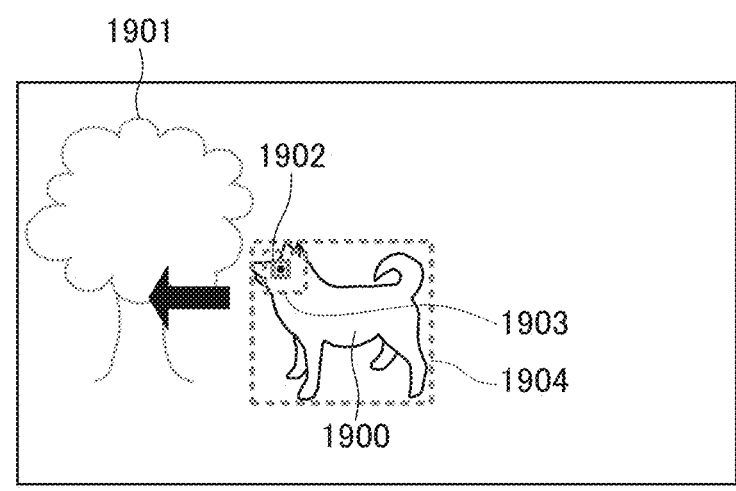
FIGS. 19A to 19C are diagrams explaining a case in which the subject is an animal.
Figure 19B:
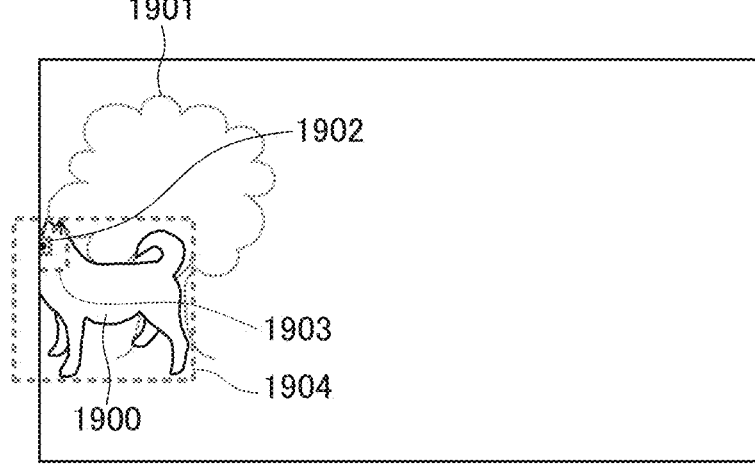
Figure 19C:
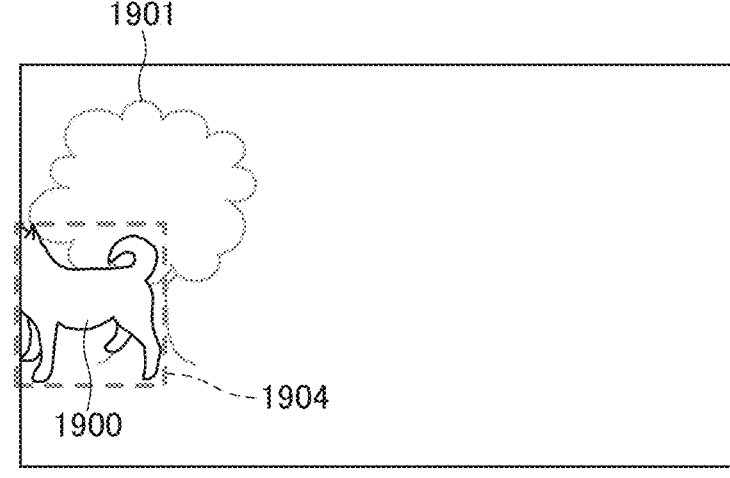

Furthermore, FIG. 19A to FIG. 19C are diagrams explaining a case in which the subject is an animal. In the same manner as for a person, it is possible to detect the pupil of an animal, the face of an animal including the pupil, and the entire body of the animal including the face, and to set these as subject tracking regions. In FIG. 19A, an animal 1900 is positioned at a closer distance than a tree 1900. In FIG. 19A, the subject tracking region corresponding to the pupil of the animal 1900 is made the first subject tracking region 1902, the subject tracking region corresponding to the face is made the second subject tracking region 1903, and the subject tracking region corresponding to the entire body is made the third subject tracking region 1904. In a case in which a region that is more included is detected, even if it is for the same animal, the camera MPU 125 performs control with the region that is included serving as the subject tracking region that is the target on which AF is performed. In FIG. 19, in which all of the first subject tracking region 1902, the second subject tracking region 1903, and the third subject tracking region 1904 can be detected, the first subject tracking region 1902 that corresponds to the pupil that serves as the subject tracking region is set as the target on which AF is performed.

FIG. 19B shows a state in which a portion of the animal 1900 has left the frame after the state in FIG. 19A. In the state in FIG. 19B, the first subject tracking region 1903, which is set as the subject tracking region, is running into the image capturing screen. Therefore, in S1701 of FIG. 17, it is determined that the subject tracking region is running into the edge of the image capturing screen. However, the face that includes the pupil and the entire body that includes the face can be detected, and the possibility that the focus will be overtaken by the tree 1901, which exists behind these, due to a perspective conflict is low. Therefore, in S1706, in a state in which a region that includes the image tracking region is being detected, as in FIG. 19B, it is determined that this does not correspond to the focus shift suppression conditions.

FIG. 19C shows a state in which a portion of the animal 1900 has further left the frame from the state in FIG. 19B. In the state in FIG. 19C, it is no longer possible to detect the pupil or the face of the animal 1900. In a case in which, in this manner, a subject for which a tracking region that is included in the third subject tracking region 1804 does not exist, it can be thought that there is a chance that the focus will shift to the tree 1901 due to a perspective conflict. Therefore, in S1706, in a case in which a region that includes the subject tracking region is not detected, it is determined that this could correspond to the focus shift suppression conditions.

Figures 20A, 20B:
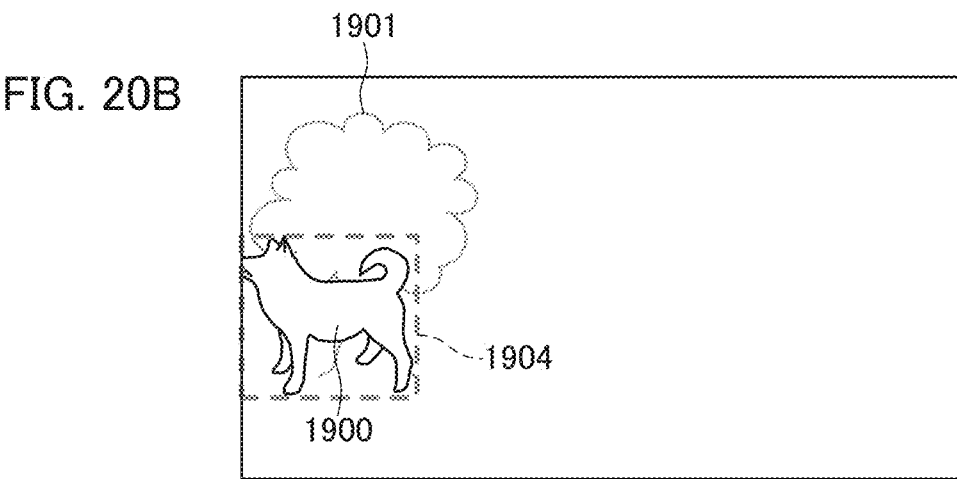
FIGS. 20A and 20B are diagrams explaining a case in which the entire body of the animal that is the subject has been detected.

FIG. 20A and FIG. 20B are diagrams explaining cases in which the entire body of the animal that is the subject has been detected. There are cases in which for an animal or a human, their face cannot be seen, and their entire body can be detected. In a case in which the entire body can be detected, but the face or the pupil cannot be detected, the entire body of the animal is set as the subject tracking region.

In this case, other subject tracking regions that are included in the subject tracking region that corresponds to the entire body do not exist. As is shown in FIG. 20A, the third subject tracking region 1904 corresponding to the entire body is set as the subject tracking region in relation to the animal 1901. As is shown in FIG. 20B, in a case in which the animal 1901 has moved to the end of the screen, the third subject tracking region 1904 runs into the end of the image capturing screen. In this case, no regions that further include the third subject tracking region 1904 corresponding to the entire body of the animal exist. Therefore, in the same manner as the case in FIG. 19C, in the case shown in FIG. 20B as well, in S1706 it is made a case in which a region that includes the subject tracking region is not detected, and it is determined that the state can correspond to the focus shift suppression conditions.

Figure 21A:
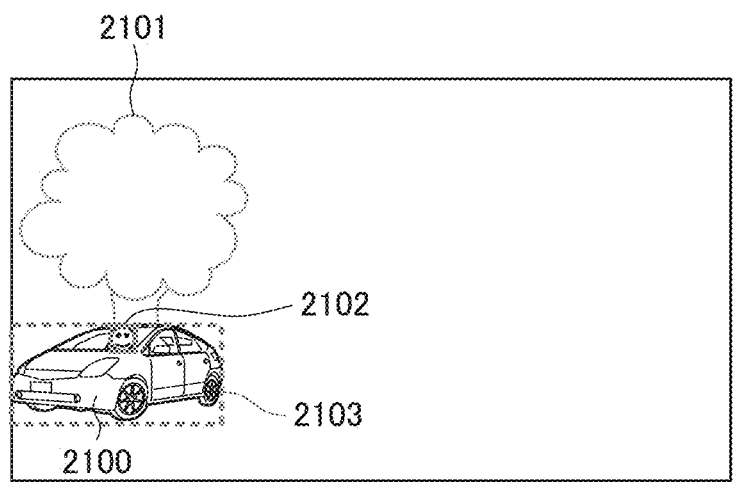
FIGS. 21A and 21B are diagrams explaining a case in which the subject is a vehicle.
Figure 21B:
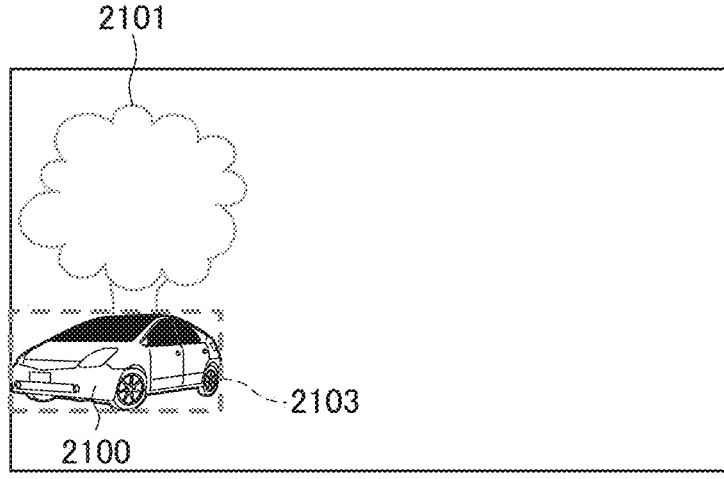

FIG. 21A and FIG. 21B are diagrams explaining a case in which the subject is a vehicle. In FIG. 21A, a vehicle 2100 is positioned at a closer distance than a tree 2101. In FIG. 21A, the subject tracking region corresponding to a driver who is operating the vehicle 2100 is made the first subject tracking region 2102, and the subject tracking region corresponding to the vehicle 2100 is made the second subject tracking region 1203. In the state in FIG. 21A, it is possible to detect the first subject tracking region 2102, and the second subject tracking region 2103 that includes the first subject tracking region 2102, and the camera MPU 125 makes the first subject tracking region 2102 the target of the AF control. In S1701, it is determined that the subject tracking region 2102 has not yet run into the end of the image capturing screen, and in S1702, it is determined that the state does not correspond to the focus shift suppression conditions. In contrast, in the state in FIG. 21B, the first subject tracking region 2102 cannot be detected, and the second subject tracking region 2103 can be detected. In S1701, it is determined that the second subject tracking region 1203 is running into the end of the image capturing screen, and furthermore, it is made a case in which, in S1706, a region that includes the subject tracking region is not detected, and it is determined that the state can correspond to the focus shift suppression conditions. In addition, in a case in which this also corresponds in S1707 and S1708, it is determined that the state corresponds to the focus shift suppression conditions in S1709.

Figure 22A:
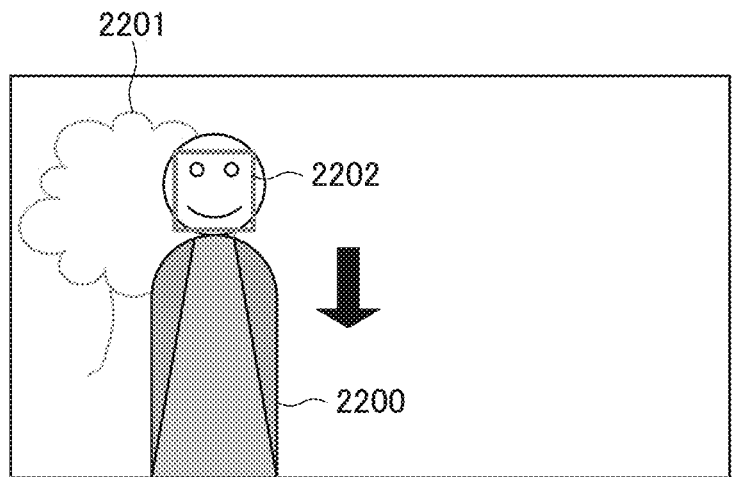
FIGS. 22A and 22B are diagrams showing an example in which, when a person is detected, it is anticipated that they will leave the frame in their parietal direction.
Figure 22B:
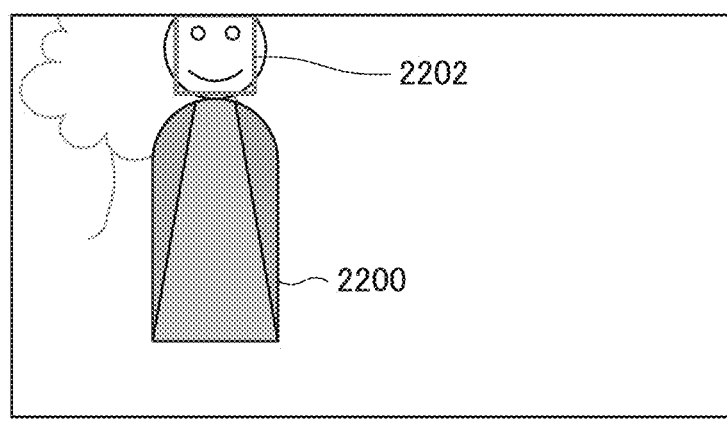

The explanation will return to FIG. 17. In S1707, in a case in which a person is being subject tracked, the camera MPU 125 determines whether or not the direction that is running into the end of the image capturing screen is the parietal direction of the person. FIGS. 22A and 22B are diagrams showing an example in which it is anticipated that their parietal direction will leave the frame at the time of the detection of the person. In FIG. 22A, the person 2200 is positioned at a closer distance than the tree 2201. Although the detected portion of the person 2200 may be their pupil, due to ease of expression, their entire face will be made the subject tracking region 2202. FIG. 22B shows a state in which the image capturing apparatus 10 is tilted in the downward direction of the screen from the state in FIG. 22A, and the subject tracking region 2203 has run into the parietal direction of the person in the image capturing screen. In the case of a person, even if the subject tracking region runs into their parietal direction, and a deviation occurs in the positions of their face and the subject tracking region, normally the body of the person exists in the opposite direction of their parietal region, and therefore, the possibility that the focus will shift to the tree 2201 in the background due to a perspective conflict is low. Therefore, in S1707, in the case in which this runs into the parietal region of the person, it is determined that the state does not correspond to the focus shift suppression conditions. In this manner, in a case in which the direction in which the subject tracking region has run into the end of the image screen is the parietal direction of the person, the processing for S1702 is performed. In contrast, in a case in which the direction in which the subject tracking region has run into the end of the image capturing screen is not the parietal direction of a person, the camera MPI 125 performs the processing for S1708.

In S1708, the camera MPU 125 determines if there is a state in which a predetermined amount of time has passed since a non-subject-tracking state changed to a subject tracking state. This is because even in a state in which the end of the subject tracking region is running into the image capturing screen, if this is directly after the subject has entered the frame from outside of the captured image, it is desirable to focus on the subject quickly, and therefore, directly after they enter the frame, it is made such that the state does not correspond to the focus shift suppression conditions.

Figure 23A:
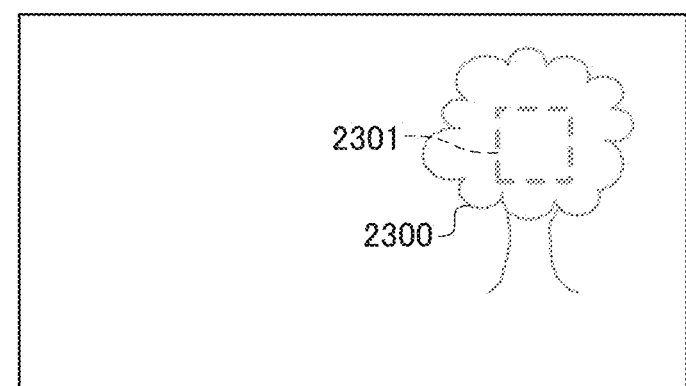
FIGS. 23A to 23D are diagrams explaining a case in which a subject enters the frame.

FIG. 23A to 23D are diagrams showing cases in which a subject enters the frame. FIG. 23A shows a state in which there is no specific subject that is the tracking target. In FIG. 23A, the AF region 2301 is set as the position of the tree 2300 from inside of the image capturing screen by AF region setting processing (S704). However, in the present embodiment, operation in the mode that performs AF at the time of subject tracking is assumed, and therefore, this is state in which there is no subject that is a tracking target within the range of the capturing image, and therefore, in S1003, AF stop processing is executed.

Figure 23B:
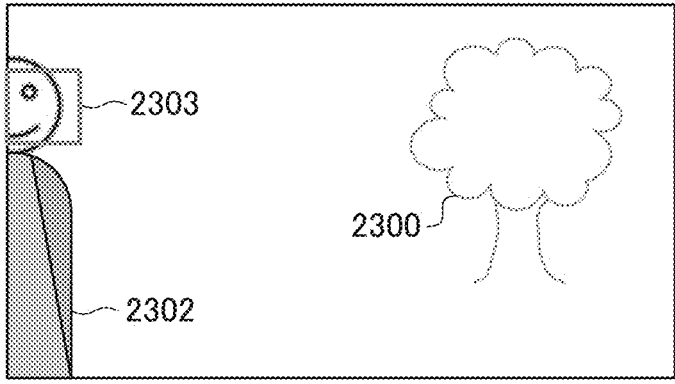

FIG. 23B shows a state in which a new person has entered the frame. Directly after the person 2302 has entered the frame, there is state in which the end of the subject tracking region 2303, which has been set as the face of the person 2302, is running into the image capturing screen, and therefore, during the processing for S1701, it is determined that the subject tracking region is running into the end of the captured image. However, it is also possible that the newly detected subject is a subject that the user would like to perform AF on, and they may wish to quickly focus on this subject. In consideration of such a possibility, in S1708, in the case in which a new subject has entered the frame, the non-subject-tracking state is changed to a subject tracking state. In addition, from the point in time at which the person subject entered the frame until a predetermined period of time has passed, even if the subject tracking region 2303 runs into the end of the image capturing screen, it is determined that the state does not correspond to the focus shift suppression conditions in S1702.

Figure 23C:
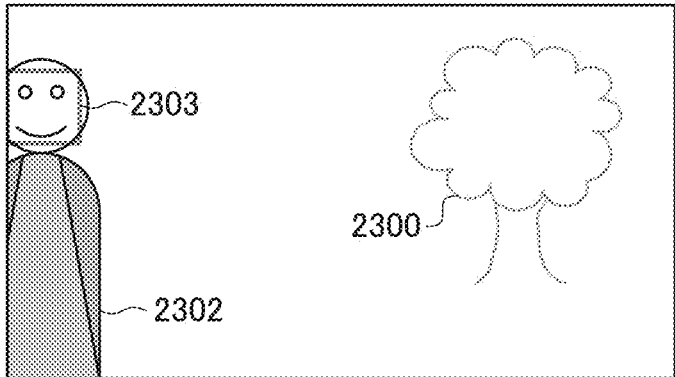
Figure 23D:
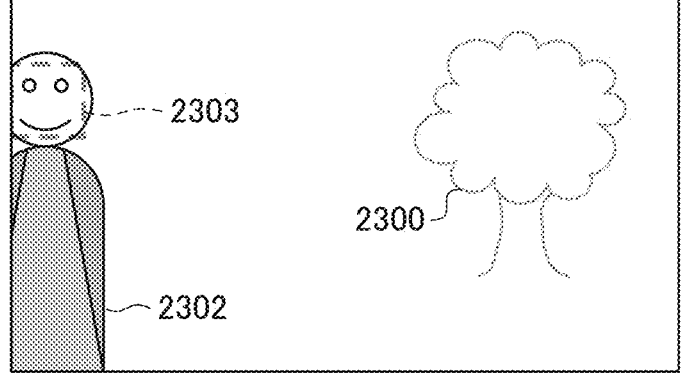

FIG. 23C shows a state after the state in FIG. 23B, and this is a state from when the non-subject-tracking state has changed to a subject tracking state until the predetermined amount of time has passed in S1708. It is before the predetermined amount of time has passed, and the state does not correspond to the focus shift suppression conditions, and therefore, although this is a state in which the subject tracking region 2303 is running into the end of the image capturing screen, it is possible to focus on the person 2302 by performing AF execution processing in S1004. FIG. 23D shows a state after the state in FIG. 23C, and this is a state in which the non-subject-tracking state has changed to a subject tracking state, and the predetermined amount of time has passed in S1708. In FIG. 23D, this is a state in which the non-subject tracking state has changed to a subject tracking state, and the predetermined amount of time has passed, and therefore, in S1709, it is determined that the state corresponds to the focus shift suppression conditions. In addition, the subject tracking state is released. In this manner, in a case that is not a state in which a non-subject-tracking state has changed to a subject tracking state and a predetermined amount of time has passed, for example, a case in which it was determined in S801 to not be a subject tracking state, and then a subject was detected in S802, or a case in which this is the state until a predetermined amount of time passes after this, the processing for S1702 is performed. In contrast, in a case in which a non-subject-tracking state has changed to a subject tracking state and a predetermined amount of time has passed, for example, a case in which there is already a subject tracking state in S801, and this state has continued for a predetermined amount of time or more, the processing for S1709 is performed.

In this manner, according to the present embodiment, even in a case in which the end of the subject tracking region runs into a predetermined region of the image capturing screen, in a case in which it is assumed that it would be better to prioritize the adherence of the focus on the subject that is being tracked, it is possible to continue the subject tracking and to adhere to the focus state. In contrast, in other cases, it is possible to not continue the subject tracking and stop the AF. Therefore, it becomes possible to suppress unintended AF control during AF control that tracks a subject.

Third Embodiment

In the First Embodiment and the Second Embodiment, focus shift suppression determination processing was performed based on if the subject tracking region was running into a predetermined range such as the periphery of the captured image, or the like. In the Third Embodiment, focus shift suppression determination processing will be performed using different criteria from the First Embodiment and the Second Embodiment. As a specific example, in the Third Embodiment, a predetermined region will be set that is more inside than a range of the captured image, and instead of further determining whether or not this runs into the predetermined region, it will be determined whether or not the subject protrudes from the predetermined region by a certain amount or more. Note that in the Third Embodiment, explanations of configurations that are the same as those in the First Embodiment will be omitted.

Figure 24:
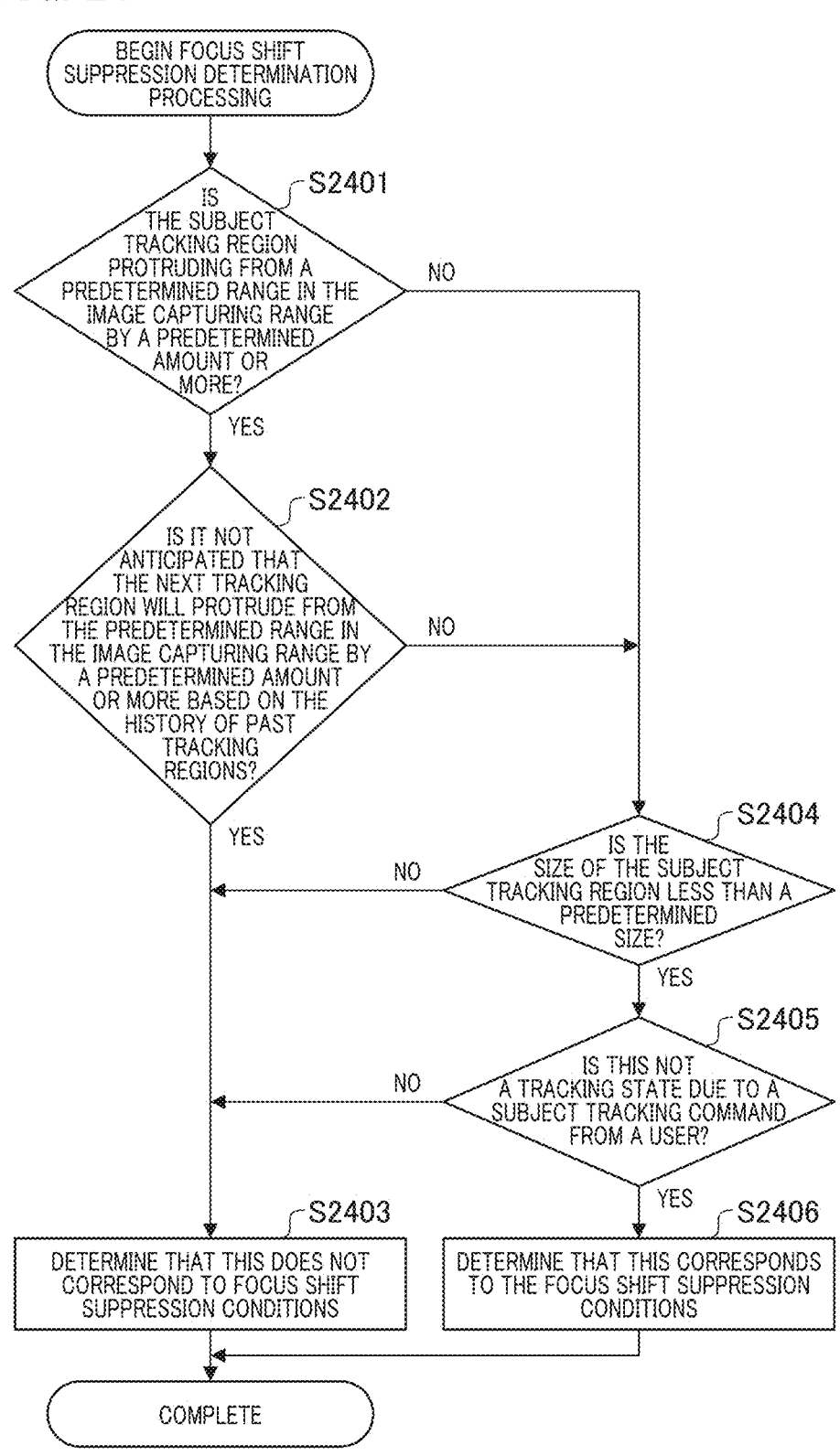
FIG. 24 is a flowchart showing focus shift suppression determination processing in a Third Embodiment.

FIG. 24 is a flowchart showing the focus shift suppression determination processing in the Third Embodiment. The focus shift determination processing is the processing that is performed y the camera MPU 125 in S806. Each processing that is shown in FIG. 24 is realized by the processor in the camera MPU 125 of the camera body 120 reading out and executing an image capturing processing program from a memory such as the ROM 125a or the like. The processing from S2403 to S2406 in FIG. 24 is the same as the processing from S902 to S905 in FIG. 9, and therefore explanations thereof will be omitted.

Figure 25A:
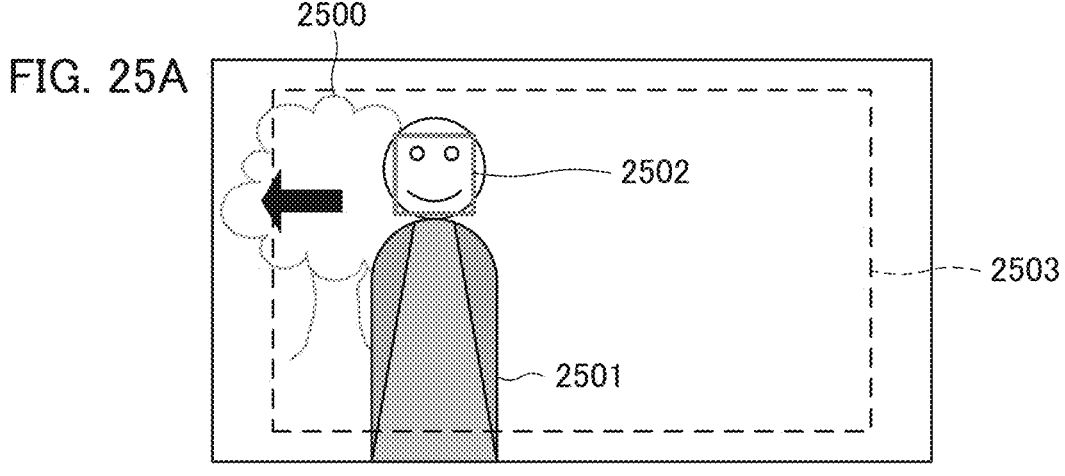
FIGS. 25A and 25B are diagrams explaining a protrusion determination.
Figure 25B:
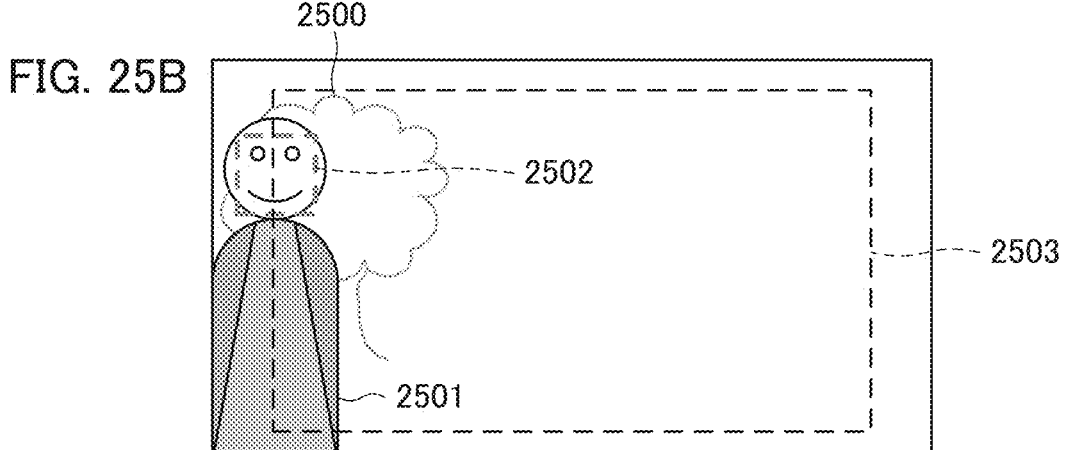

In S2401, the camera MPU 125 determines whether or not the subject tracking region is protruding from a predetermined region in the image capturing range by a certain amount or more. In this context, the predetermined range in the image capturing region is a predetermined range than includes a center that is more towards the inside of the range for the image capturing screen. FIG. 25A and FIG. 25B are images explaining the protrusion determination. FIG. 25A shows a scene in which, within the image capturing screen, there is a person 2501 at a closer subject distance, and there is a tree 2500 at a farther subject distance. FIG. 25B is a state after FIG. 25A, and shows that the subject tracking region 2502 is protruding by a predetermined amount or more from a protrusion determination region 2503. Note that the composition of FIG. 25A is the same as the composition of FIG. 13A and the composition of FIG. 25B is the same as the composition of FIG. 13B. In the present embodiment, a predetermined range within the image capturing screen is set as the protrusion determination range 2503. In addition, the camera MPU 125 determines whether or not the subject tracking region 2502 is protruding from the protrusion determination range 2503 by a predetermined amount or more. The predetermined amount for protrusion is set as, for example, half or more of the subject tracking region, by taking into consideration the load for functions and calculations, and the like. In the present embodiment, as one example, half of the subject tracking region is made the threshold. In FIG. 25B, the subject tracking region 2502 is protruding from the protrusion determination region by half or more, and therefore, it is determined that it is possible that the state corresponds to the focus shift suppression conditions. After this, in a case in which the state also corresponds to these conditions in S2404 and S2405, it is determined that they correspond to the focus shift suppression conditions. In this manner, in a case in which it has been determined that the subject tracking region is not protruding from a predetermined region within the image capturing range by a predetermined amount or more, the camera MPU 125 performs the processing for S2402. In contrast, in a case in which it has been determined that the subject tracking region is protruding from the predetermined region of the image capturing range by the predetermined amount or more, the camera MPU 125 performs the processing for S2404. Note that after the processing for S2405, the processing for S1705 to S708 that was explained in the Second Embodiment may also be performed.

In S2404, the camera MPU 125 determines whether or not it is anticipated that the subject tracking region will protrude from the predetermined range in the image capturing range (the protrusion determination range) based on the history of the past positions of the subject tracking region. In a case in which it is not anticipated that the subject tragion will protrude from the predetermined range within the image capturing range by a predetermined amount or more, the camera MPU 125 performs the processing for 2403. In contrast, in a case in which it is anticipated that the subject tracking region will protrude from the predetermined region within the image capturing region by the predetermined amount or more, the camera MPU 125 performs the processing for S2404.

Figure 26A:
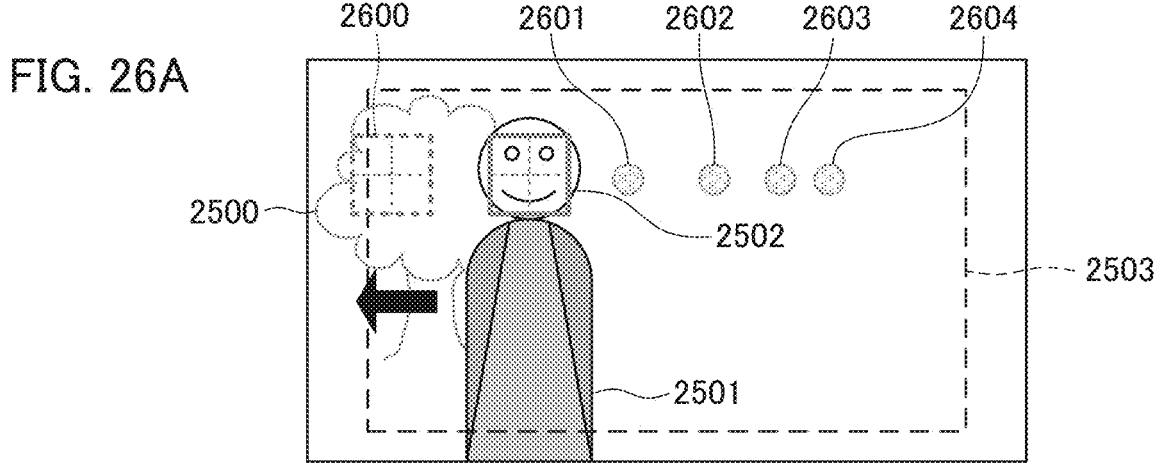
FIGS. 26A and 26B are diagrams explaining that it is anticipated that a subject will protrude from a protrusion determination range of a subject tracking region.
Figure 26B:
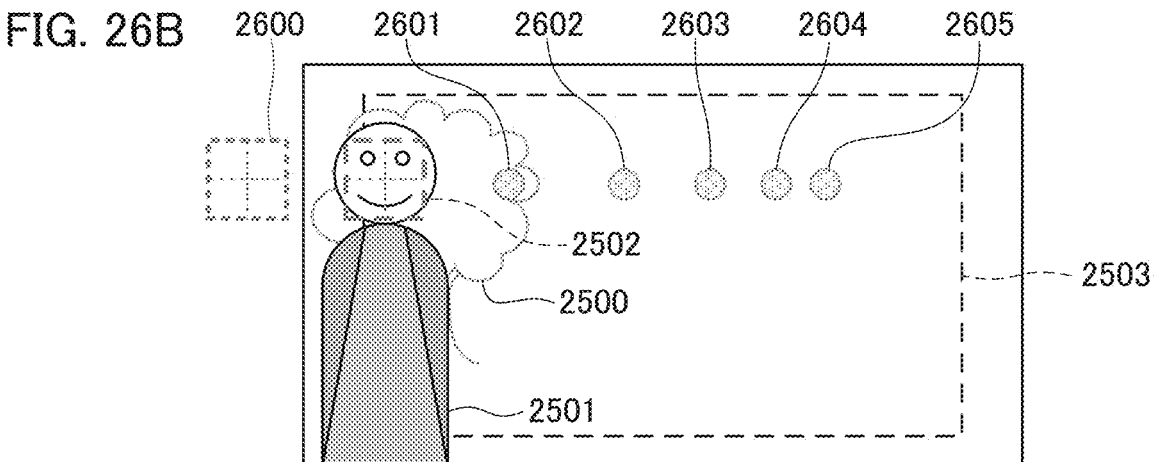

FIGS. 26A and 26B are diagrams explaining the anticipation that the subject tracking region will protrude from the protrusion determination region. FIG. 26A shows a scene in which there is a person 2501 at a closer subject distance and a tree 2500 at a farther subject distance within the image capturing screen. FIG. 26B is a state after FIG. 26A. Note that the composition for FIG. 26A is the same as the composition for FIG. 25A, and the composition for FIG. 26B is the same as the composition for FIG. 25B. FIG. 26A shows an example of past tracking position histories 2601 to 2604, and a predicted tracking region 2600 in addition to FIG. 25A. The predicted tracking region 2600 is predicted based on the positions for the past tracking position histories 2601 to 2604. Note that the predicted tracking region 2600 may also be predicted based on the past tracking position histories 2601 to 2604 and the position of the current subject tracking region 2501. The calculation for the predicted tracking region 2600 is set as being linear, quadratic, or the like by taking into account the load for of functions and calculations, or the like. In S2402, in order to determine if it is anticipated that the subject tracking region will protrude from the protrusion determination region 2503 of the image capturing range by the predetermined amount or more, the range for the next predicted tracking region 2600 is calculated, and it is determined whether or not the next predicted tracking region 2600 will protrude from the protrusion region 2503 by the predetermined amount or more. The threshold for the protrusion amount is made, for example, half of the next predicted tracking region 2600. In the state in FIG. 26A, the next predicted tracking region 2600 is not protruding from the protrusion determination region 2503 by half or more, and therefore, it is determined that it is not anticipated that the subject tracking region will protrude from the protrusion determination region. In the state in FIG. 26B, the next predicted tracking region 2600 that is predicted based on the past tracking position histories 2601 to 2604 is protruding from the protrusion determination range 2503 by the predetermined amount or more. Note that the position of the next predicted tracking region 2600 may also be predicted based on the past tracking position histories 2601 to 2604 and the current subject tracking region 2502. Therefore, it is determined that it is anticipated that the subject tracking region will protrude from the protrusion determination region 2503. It is possible to more quickly determine whether or not it is anticipated that the subject will leave the frame in a case such as when the subject that is being tracked has moved in the direction of outside of the image capturing screen due to the determination in S2402.

Figure 27A:
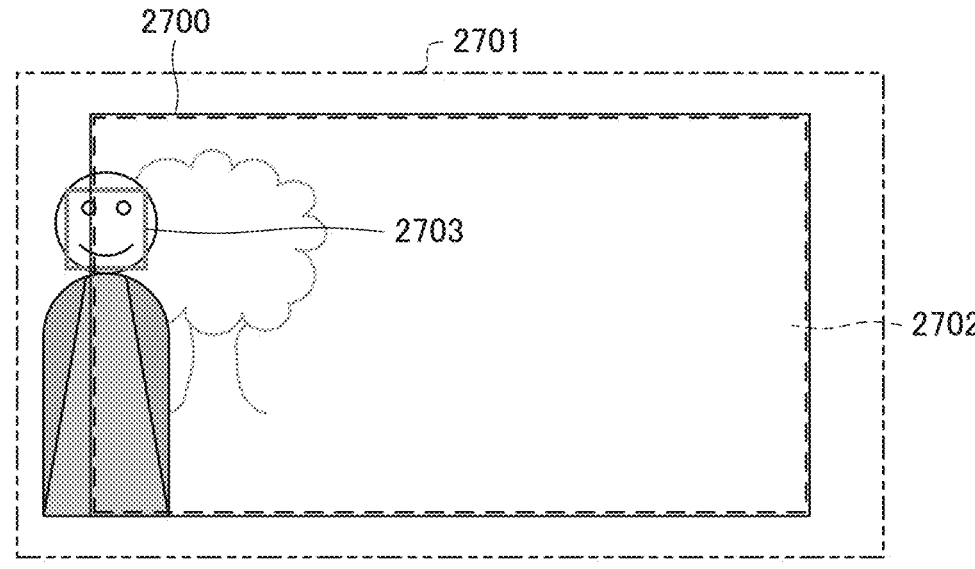
FIGS. 27A and 27B are diagrams explaining an example of setting an image capturing screen as a portion of image capturing signals.
Figure 27B:
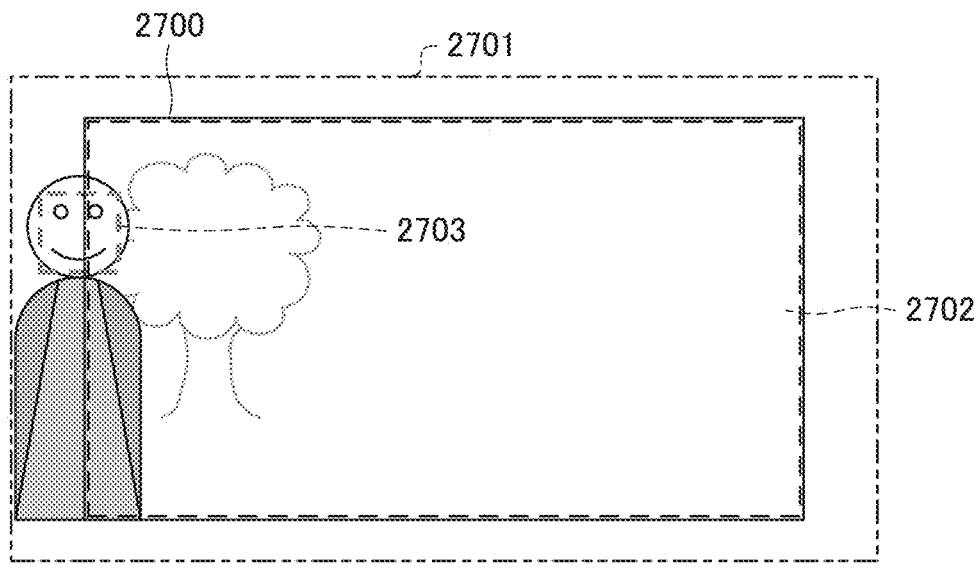

In this context, an example will be explained for a case in which it has been assumed that the image capturing screen has been set as a portion from among the image capturing signals, or the like will be explained using FIG. 27A and FIG. 27B. In a case in which the image capturing screen has been set as a portion from among the image capturing signals, there are also image capturing signals outside of the image capturing screen, and therefore, there are cases in which AF and subject tracking are also possible outside of the image capturing screen. FIG. 27A and FIG. 27B are diagrams explaining an example in which the image capturing screen is set in a portion of the image capturing signals. As is shown in FIG. 27A and FIG. 27B, an AF/subject tracking possible region 2701 is provided on the outer side of the image capturing screen 2700. Therefore, it is possible to set the protrusion determination region 2702 at the end of the image capturing screen 2700. Note that it is also possible to set the protrusion determination range 2702 outside of the image capturing screen but inside of the AF/Subject tracking possible region. In addition, it is also possible to perform subject tracking outside of the image capturing screen 2700, and therefore, it is also possible to suppress the occurrence of deviations between the actual range for the subject in the image capturing screen and the subject tracking region to begin with. In a case in which the threshold for the protrusion range is made half of the subject tracking region 2703, this becomes a state in which in FIG. 27A, the subject tracking is continued, and in FIG. 27B in which subject tracking is not performed.

As was explained above, according to the present embodiment, in a case in which during the mode in which AF is performed at the time of subject tracking, the subject tracking region protrudes from a predetermined range of the image capturing screen (the protrusion range) by a predetermined amount or more, even if this is state in which a subject can be detected, subject tracking is not continued and AF is stopped. It is thereby possible to suppress a state in which the focus is on something other than the subject due to a perspective conflict, which could possibly occur when the subject leaves the frame from the image capturing screen and the AF range finding region in the mode in which AF is performed at the time of subject tracking. Therefore, it becomes possible to suppress unintended AF control in AF control that tracks a subject.

Fourth Embodiment

In the First to Third Embodiments, examples were explained in which focus adjustment by AF processing was suppressed by releasing a subject tracking state. In the Fourth Embodiment, an example will be explained in which focus adjustment is suppressed by AF processing by prohibiting focus adjustment in an infinite direction while continuing the tracking state. Note that in the present embodiment, explanations will be omitted for the configurations that are the same as those in the First Embodiment. In the present embodiment, the processing that is shown in FIG. 28 is performed as the subject tracking state setting processing for S703, and the processing that is shown in FIG. 29 is performed as the AF processing for S709.

Figure 28:
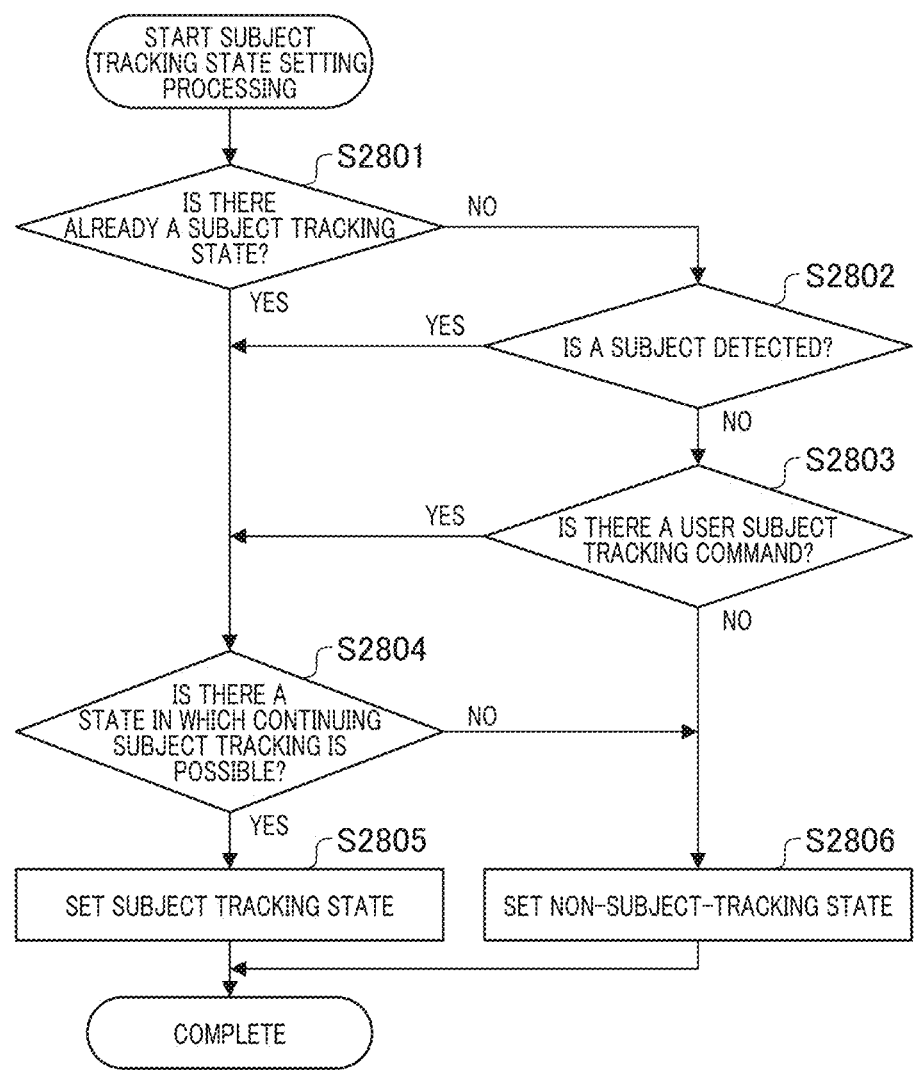
FIG. 28 is a flowchart showing subject tracking state setting processing in a Fourth Embodiment.

FIG. 28 is a flowchart showing the subject tracking state setting processing in the Fourth Embodiment. The subject tracking state setting processing is processing that is performed by the MPU 125 in S703. Each processing that is shown in FIG. 28 is realized by the processor in the MPU 125 of the camera body 120 reading out and executing an image capturing processing program from a memory such as the ROM 125a or the like.

The processing for S2801 to S2804, and the processing for S2805 and S2806 in FIG. 28 are the same as the processing for S801 to S804 and S808 and S809 in FIG. 8, and therefore, explanations thereof will be omitted. In the present embodiment, each processing that is shown from S805 to S807 of FIG. 8 is not executed in the subject tracking state setting processing that is shown in FIG. 28, but is executed in the AF processing that is shown in FIG. 29.

Figure 29:
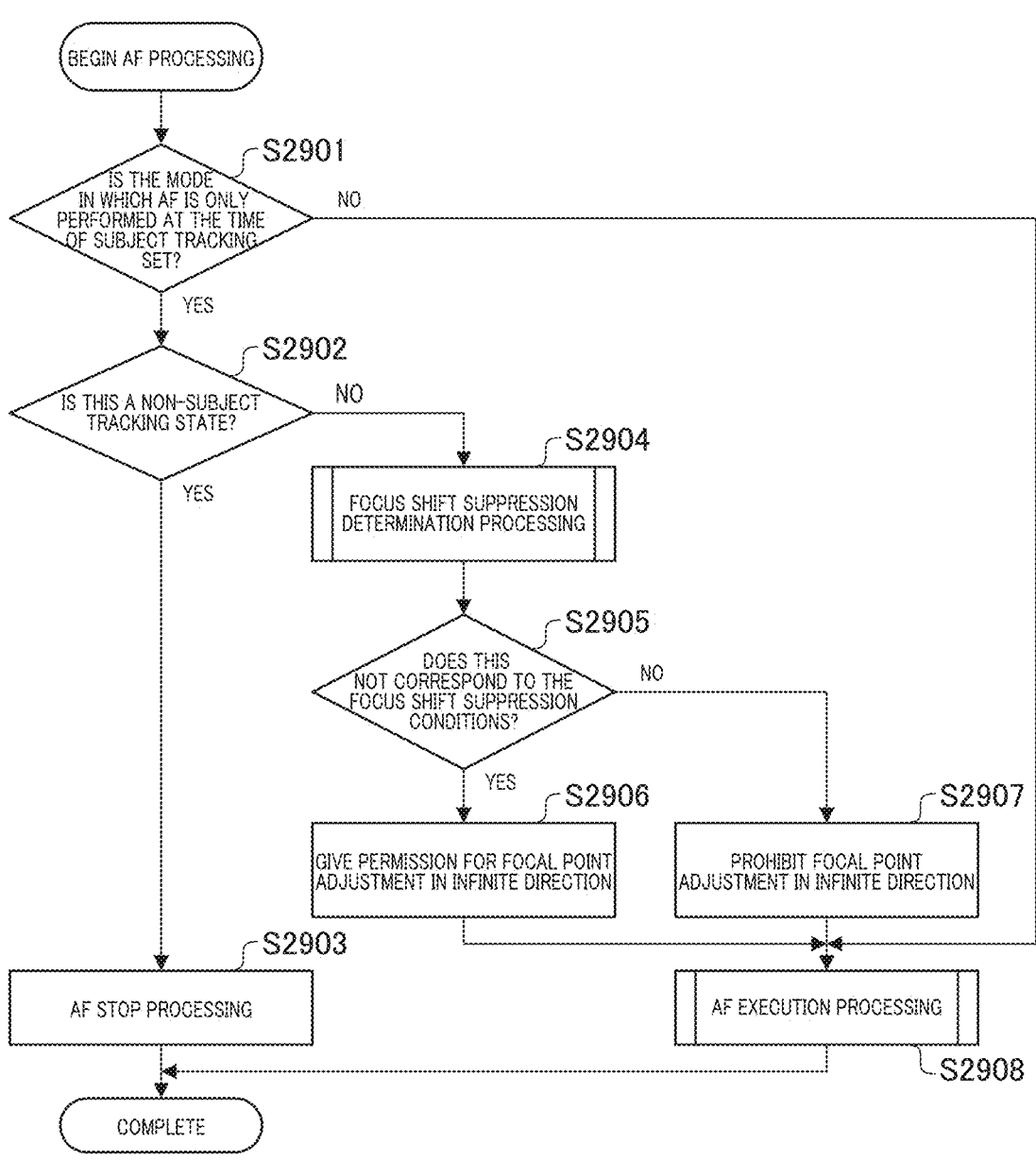
FIG. 29 is a flowchart showing AF processing in the Fourth Embodiment.

FIG. 29 is a flowchart showing the AF processing in the Fourth Embodiment. The AF processing is processing that is performed by the camera MPU 125 in S709. Each processing that is shown in FIG. 29 is realized by the processor in the camera MPU 125 of the camera body 120 reading out and executing an image capturing processing program from a memory such as the ROM 125a, or the like. Note that the processing for S2901 to S2903, and the processing for S2908 in FIG. 29 are the same as the processing for S1001 to S1003 and S1004 of FIG. 10, and therefore detailed explanations thereof will be omitted.

In S2904, the camera MPU 125 performs the focus shift suppression determination processing. The focus shift suppression determination processing for S904 is the same as that in the flowchart for FIG. 17, and therefore an explanation thereof will be omitted. Upon the completion of the focus shift suppression determination processing, the camera MPU 125 performs the processing for S2905. In S2905, the camera MPU 125 determines whether or not the state does not correspond to the focus shift suppression conditions. In a case in which the state does not correspond to the focus shift suppression conditions, the camera MPU 125 performs the processing for S2906. In contrast, in a case in which the state does correspond to the focus shift suppression conditions, the camera MPU 125 performs the processing for S2907. In S2906, the camera MPU 125 gives permission for focus adjustment in an infinite direction. After giving permission for focus adjustment in an infinite direction, the camera MPU 125 performs the AF execution processing for S2908. In S2907, the camera MPU 125 prohibits focus adjustment in an infinite direction. After prohibiting focus adjustment in an infinite direction, the camera MPU 125 performs the AF execution processing for S2908.

Figure 30:
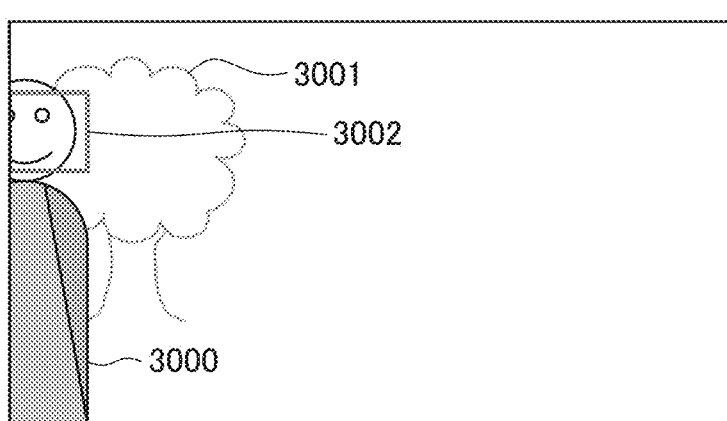
FIG. 30 is a diagram explain focus shift suppression by AF processing.

In the present embodiment, instead of continuing subject tracking, focus shift suppression is performed by the AF processing. The focus shift suppression by AF processing will be explained using FIG. 30. FIG. 30 is a diagram explaining focus shift suppression by AF processing. In the present embodiment, in the subject tracking state setting processing of FIG. 28, a determination for the focus shift suppression state is not performed. Therefore, as is shown in FIG. 30, this becomes state in which inside of the subject tracking region 3002, a person 3000 who is at a closer distance, and a tree 3001 that is at a farther distance are in perspective conflict. In the present embodiment, by preventing the focus from shifting to the tree, which is farther way, using AF processing, focus shift to the tree 3001 is suppressed. In a case in which the state corresponds to the focus shift suppression conditions in S2905, it is set such that in S2907, focus adjustment in an infinite direction is prohibited. In addition, during the AF execution processing for S2908, in a case in which focus adjustment in an infinite direction is attempted, control will be performed such that AF is not performed. Note that when the state does not correspond to the focus shift suppression conditions in S2905, the permission settings are switched such that it is once again possible to execute focus adjustment in an infinite direction in S2906.

According to the present embodiment, it becomes possible to suppress focal adjustment by AF processing while still continuing a subject tracking state. It thereby becomes possible to suppress unintended AF control during AF control that tracks a subject.

Fifth Embodiment

In the Fourth Embodiment, an example has been explained in which unintended focus adjustment due to AF processing is suppressed by changing the focal adjustment operation while continuing a subject tracking state. In addition, in the Fourth Embodiment, as an example of the change to the focus adjustment operation, the example of prohibiting focus adjustment in an infinite direction has been explained. In the Fifth Embodiment, as an example of the change to focus adjustment operations, examples will be explained of slowing down the speed of the focus adjustment, making the switching time of the focus adjustment state longer, and limiting the direction in which the focus adjustment position is prioritized. Note that in the present embodiment, explanations will be omitted for the configurations that are the same as those in the Fourth Embodiment.

Figure 31:
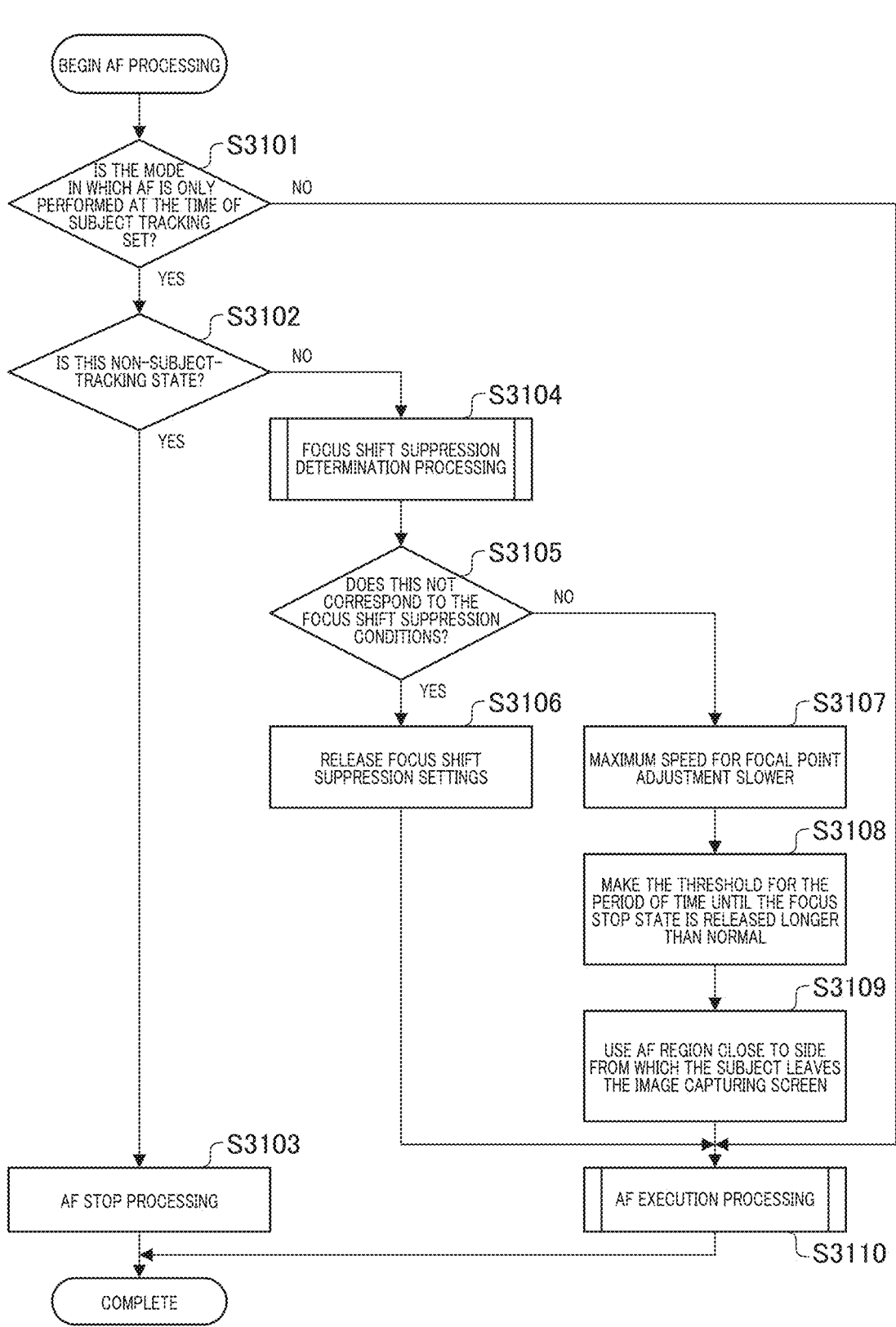
FIG. 31 is a flowchart showing AF processing in a Fifth Embodiment.

The details for each type of processing that are performed by the camera body 120 will be explained. In the present embodiment, the AF processing that is shown in FIG. 31 is executed as the AF processing for S709 of FIG. 7. FIG. 31 is flowchart showing the AF processing in the Fifth Embodiment. AF processing is the processing performed by the camera MPU 125 in S709. Each processing that is shown in FIG. 29 is realized by the processor in the camera MPU 125 of the camera body 120 reading out and executing an image capturing processing program from a memory such as the ROM 125a or the like. Note that the processing for S3101 to S3105 and the processing for S3110 of FIG. 31 are the same as the processing for S2901 to S2905 and the processing for S2908 in FIG. 29, and therefore, explanations thereof will be omitted.

In S3105, in a case in which it has been determined that the state does not correspond to the focus shift suppression conditions, the camera MPU 125 performs the processing for S3106. In S3106, the camera MPU 125 releases the focus shift suppression settings. The focus shift suppression settings are the settings that are executed from S3107 to S3109, which will be explained below, and in S3106, it will be made such that these are returned to the original settings. Note that if the settings are not changed to begin with from S3107 to S3109, they will remain the same settings. Upon releasing the focus shift suppressing settings, the MPU 125 performs the processing for S3110.

In S3105, in a case in which it has been determined that the state corresponds to the focus shift suppression conditions, the camera MPU 125 performs the processing for S3107. In S3107, the camera MPU 125 performs settings such that the upper speed limit for the focus adjustment becomes slower. By setting the upper speed limit for the focus adjustment so as to be slower, as is shown in FIG. 30, in a case in which subjects such as the person 3000 and the tree 3001, which is non-person subject that is farther away, are in perspective conflict, it is possible to suppress the degree of focus shift to the non-person subject. Upon the upper speed limit for the focal adjustment being set so as to be slower, the camera MPU 125 performs the processing for S3108.

In S3108, the camera MPU 125 sets the time for releasing the focus stop state so as to be longer than normal. The time for releasing the focus stop state is set so as to be longer than normal in order to suppress focus shift. The AF execution processing in S3110 is the same as the AF execution processing that is shown in FIG. 11. During the AF execution processing, in S1111, it is determined whether or not a state in which the defocus amount is not within the focal depth has continued for a predetermined amount of time, and in the corresponding case, there is processing to release the focus stop state in S1112. That is, in the flowchart that is shown in FIG. 11, in S1111, it is determined whether or not a state in which the defocus amount is not within the focal depth has continued for a predetermined amount of time, and in the corresponding case, there is processing to release the focus stop state in S1112. Even in a case in which the person 3000 of FIG. 30 and a non-person subject that is farther away (for example, the tree 3001) are in perspective conflict, it is possible to suppress focus shift to a subject other than the person 3000 to begin with if there is a focus stop state. In S3108, by making the time that it takes to release the focus stop stake longer than usual, it is possible to increase the possibility of being able to suppress focus shift. Upon setting the time taken to release the focus stop state so as to be longer than usual, the camera MPU 125 performs the processing for S3109.

Figure 32:
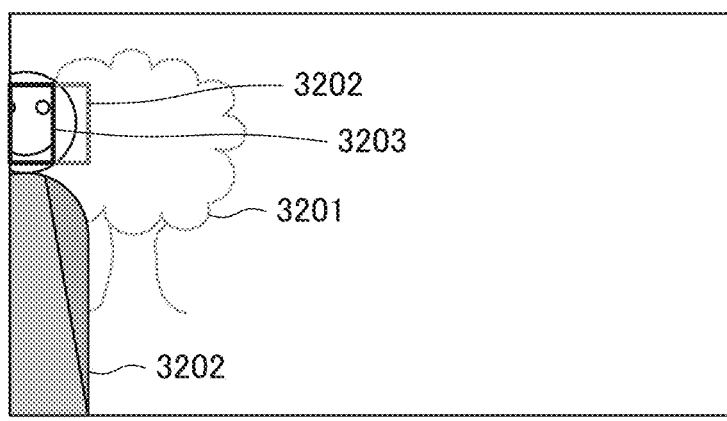
FIG. 32 is a diagram showing one example of setting an AF region along a side in which a subject leaves the image capturing screen.

In S3109, the camera MPU 125 performs control such that an AF region that is close to the side where the subject is leaving the image capturing screen is used. The AF region that is close to the side where the subject leaves the image capturing screen is a focus adjustment position in the same direction as the direction of the subject tracking region in the image capturing screen from when it was determined that the subject tracking region was at the end of the captured image. FIG. 32 is a diagram showing one example in which an AF region close to the side where the subject is leaving the image capturing screen is set. In the subject tracking region 3202, it is possible that perspective conflict will occur between the person 3200 and a non-person subject that is further away (for example, the tree 3201). However, it can be thought that the person 3200 exists in the image capturing screen on the side that the subject tracking region 3203 runs into. Therefore, by setting a region that has been limited to the side that the subject tracking region 3202 runs into as the AF region, it is possible to resolve the perspective conflict, and to suppress focus shift to a subject other than the person 3200. Upon performing control such that the AF region 3203 that is close to the side where the subject leaves the image capturing screen is used, the camera MPU 125 next performs the AF execution processing for S3110. The AF execution processing for S3110 is the same as the AF execution processing that is shown in FIG. 11.

According to the present embodiment, it becomes possible to suppress focal adjustment by AF processing while continuing a subject tracking state. It thereby becomes possible to suppress unintended AF control during AF control that tracks a subject.

Other Embodiments

Embodiment(s) of the disclosure can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-014378, filed Feb. 2, 2023, which is hereby incorporated by reference herein in its entirety.

What is claimed is:
1. An apparatus comprising:
at least one process and a memory coupled to the at least one processor storing instructions that, when executed by the at least one processor, cause the at least one processor to function as:

a detecting unit configured to detect a subject from a captured image;
a tracking unit configured to track the detected subject;
a focus adjusting unit configured to control focus adjustment based on the captured image; and
a determining unit configured to determine whether or not a tracking region in which a predetermined subject is being tracked is at an end portion of a captured image when a focal adjustment mode is set, wherein the focal adjustment mode is a mode in which focus adjustment is performed in the tracking region when the predetermined subject is being tracked by the tracking unit, and focal adjustment is not performed when the predetermined subject is not being tracked,
wherein the tracking unit releases a tracking state in a case in which the determining unit has determined that the tracking region is at an end portion of a captured image.

2. The apparatus according to claim 1, wherein in a case where it is determined that the tracking region is at an end portion of a captured image, and where a part that is included in a larger detected part is detected as a detected part of the specific subject that is being tracked, the tracking unit does not release the tracking state.

3. The apparatus according claim 1, wherein in a case where it is determined that the tracking region is at an end portion of a captured image, and where a size in a screen of the subject being tracked is larger than a predetermined size, the tracking unit does not release the tracking state.

4. The apparatus according claim 1, wherein in a case where it is determined that the tracking region is at an end portion of a captured image, the tracking unit does not release the tracking state during a period in which a predetermined amount of time passes since a state in which the detecting unit does not detect as subject has changed to a state in which the detecting unit does detect a subject.

5. The apparatus according to claim 1, wherein in a case where it is determined that the tracking region is at an end portion of a captured image, and the specific subject is a person, and a direction in a screen of the tracking region that the determining unit determined is at an end portion of a captured image is the direction of the head of the person, the tracking unit does not release the tracking state.

6. The apparatus according to claim 1, wherein in a case where it is determined that the tracking region is at an end portion of a captured image, and tracking is being performed due to a user operation to the apparatus, the tracking unit does not release the tracking state.

7. The apparatus according to claim 1, wherein the at least one processor further functions as a subject registering unit that is able to register a subject in the apparatus;
wherein in a case it is determined that the tracking region is at an end portion of a captured image, and a subject that was registered by the subject registering unit is being tracked, the tracking unit does not release the tracking state.

8. The apparatus according to claim 1, wherein after release of the tracking state has been performed, in a case in which the determining unit no longer determines that the tracking region is at an end portion of a captured image, the tracking unit once again performs tracking of the specific subject.

9. The apparatus according to claim 1, wherein in a case where the tracking region runs into an end of an angle of view, or where the tracking region protrudes from a predetermined region that has been set within a captured image by a predetermined amount or more, the determining unit determines that the tracking region is at an end portion of a captured image.

10. The apparatus according to claim 1, wherein in a case where a next position of the tracking region that is predicted based on past positions of the tracking region protrudes from a predetermined region that has been set in a captured image by a predetermined amount or more, the determining unit determines that the tracking region is at an end portion of a captured image.

11. An apparatus comprising:

at least one processor and a memory coupled to the at least one processor storing instructions that, when executed by the at least one processor, cause the at least one processor to function as:

a detecting unit configured to detect a subject from a captured image;

a tracking unit configured to track the detected subject;

a focus adjusting unit configured to control focus adjustment based on the captured image;

a determining unit configured to determine whether or not a tracking region in which a predetermined subject is being tracked is at an end portion of a captured image when a focal adjustment mode is set, wherein the focal adjustment mode is a mode in which focus adjustment is performed in the tracking region when the predetermined subject is being tracked by the tracking unit, and focal adjustment is not performed when the predetermined subject is not being tracked, wherein the focus adjusting unit changes a focus adjustment operation in a case in which the determining unit has determined that the tracking region is at an end portion of a captured image.

12. The apparatus according to claim 11, wherein in a case where it is determined that the tracking region is at an end portion of a captured image, the focus adjusting unit prohibits focus adjustment in an infinite direction.

13. The apparatus according to claim 11, wherein in a case it is determined that the tracking region is at an end portion of a captured image, the focus adjusting unit makes a speed of focus adjustment slower.

14. The apparatus according to claim 11, wherein in a case where it is determined that the tracking region is at an end portion of a captured image, the focus adjusting unit makes a period of time in which switching from a state in which focus adjustment is stopped to a state in which focus adjustment is executed longer.

15. The apparatus according to claim 11, wherein in a case it is determined that the tracking region is at an end portion of a captured image, the focus adjusting unit prioritizes use of a focus adjustment position that is in the same direction as the direction of the tracking region in a captured image from when the determining unit determined that the tracking region is at an end portion of a captured image.

16. The apparatus according to claim 11, wherein in a case it is determined that the tracking region is at the end portion of the captured image, and that corresponds to any of a case where a part that is included in a larger detected part is detected as a detected part of the subject that is being tracked, a case in which a size of the subject being tracked in a screen is larger than a predetermined size, a case in which it is a period until a predetermined amount of time has passed since a state in which the detecting unit does not detect a subject has changed to a state in which the detecting unit does detected a subject, a case in which the specific subject is a person and a direction in a screen of the tracking region that the determining unit has determined is at an end portion of a captured image is the direction of the head of the person, a case in which tracking is being performed due to a user operation to the apparatus, or a case where a subject was registered by a subject registering unit is being tracked, the focus adjusting unit does not perform changes to focus adjustment operations.

17. The apparatus according to claim 11, wherein in a case where the tracking region is running into an end of an angle of view, or in a case where the tracking region protrudes from a predetermined region that has been set within a captured image by a predetermined amount or more, the determining unit determines that the tracking region is at an end portion of a captured image.

18. The apparatus according to claim 11, wherein in a case where a next position of the tracking region that is predicted based on past positions of the tracking region protrudes from a predetermined region that has been set in a captured image by a predetermined amount or more, the determining unit determines that the tracking region is at an end portion of a captured image.

19. The apparatus according to claim 11, further comprising a sensor configured to output a plurality of images by receiving luminous fluxes that have passed through different pupil regions of an optical system, and wherein the at least one processor further functions as a focus detecting unit configured to detect a defocus amount from the plurality of images.

20. A method for an apparatus comprising:

detecting a subject from a captured image;

tracking the subject that was detected during the detecting;

controlling focus adjustment based on the captured image;

determining whether or not a tracking region in which a predetermined subject is being tracked is at an end portion of a captured image when a first focal adjustment mode is set, wherein the first focal adjustment mode is a mode in which focus adjustment is performed in the tracking region when the predetermined subject is being tracked, and focal adjustment is not performed when the predetermined subject is not being tracked; and releasing a tracking state in a case in which it has been determined that the tracking region is at an end portion of a captured image.

21. A method for an apparatus comprising:

detecting a subject from a captured image;

tracking the subject that was detected during the detecting;

controlling focus adjustment based on the captured image;

determining whether or not a tracking region in which a predetermined subject is being tracked is at an end portion of a captured image when a first focal adjustment mode is set, wherein the first focal adjustment mode is a mode in which focus adjustment is performed in the tracking region when the predetermined subject is being tracked, and focal adjustment is not performed when the predetermined subject is not being tracked; and changing focal adjustment operations in a case in which it has been determined that the tracking region is at an end portion of a captured image.

22. A non-transitory storage medium storing a control program of an apparatus causing a computer to perform a method of the apparatus, the method comprising:

detecting a subject from a captured image;

tracking the subject that was detected during the detecting;

controlling focus adjustment based on the captured image;

determining whether or not a tracking region in which a predetermined subject is being tracked is at an end portion of a captured image when a first focal adjustment mode is set, wherein the first focal adjustment mode is a mode in which focus adjustment is performed in the tracking region when the predetermined subject is being tracked, and focal adjustment is not performed when the predetermined subject is not being tracked; and releasing a tracking state in a case in which it has been determined that the tracking region is at an end portion of a captured image.

23. A non-transitory storage medium storing a control program of an apparatus causing a computer to perform a method of the apparatus, the method comprising:

detecting a subject from a captured image;

tracking the subject that was detected during the detecting;

controlling focus adjustment based on the captured image;

determining whether or not a tracking region in which a predetermined subject is being tracked is at an end portion of a captured image when a first focal adjustment mode is set, wherein the first focal adjustment mode is a mode in which focus adjustment is performed in the tracking region when the predetermined subject is being tracked, and focal adjustment is not performed when the predetermined subject is not being tracked; and changing focal adjustment operations in a case in which it has been determined that the tracking region is at an end portion of a captured image.

\* \* \* \* \*